(12) United States Patent
Achar et al.

(10) Patent No.: US 12,311,748 B1
(45) Date of Patent: May 27, 2025

(54) MODULAR ELECTRONIC COMPONENT ENCLOSURE

(71) Applicant: Rivian IP Holdings, LLC, Irvine, CA (US)

(72) Inventors: Sriniket Sreenivas Achar, Sterling Heights, MI (US); Akash Thombre, Tustin, CA (US); Piyush Khater, Mission Viejo, CA (US); Bruce Philip Edwards, Menlo Park, CA (US); Suraj Shroff, Sunnyvale, CA (US); Tom Jolly, Leicester (GB); Brandon Louis Fennema, Rancho Santa Margarita, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/583,769

(22) Filed: Feb. 21, 2024

(51) Int. Cl.
| | | |
|---|---|---|
| *B60K 1/04* | (2019.01) | |
| *H01M 50/209* | (2021.01) | |
| *H01M 50/24* | (2021.01) | |
| *H01M 50/249* | (2021.01) | |

(52) U.S. Cl.
CPC ............. *B60K 1/04* (2013.01); *H01M 50/209* (2021.01); *H01M 50/24* (2021.01); *H01M 50/249* (2021.01); *B60K 2001/0438* (2013.01); *H01M 2220/20* (2013.01)

(58) Field of Classification Search
CPC ............. B60K 1/04; B60K 2001/0438; H01M 50/209; H01M 50/24; H01M 50/249
See application file for complete search history.

(56) References Cited

U.S. PATENT DOCUMENTS

| | | | |
|---|---|---|---|
| 9,108,497 B2 * | 8/2015 | Harrison, III | ............ B60K 1/04 |
| 9,533,600 B1 | 1/2017 | Schwab et al. | |
| 2003/0062180 A1 * | 4/2003 | Jones | ................... H05K 9/0015 |
| | | | 174/385 |

OTHER PUBLICATIONS

Wienkotter, "The battery: Sophisticated thermal management, 800 volt system voltage," Porsche Newsroom AUS, retrieved from https://newsroom.porsche.com/en_AU/products/taycan/battery-18557.html, Apr. 10, 2024, 4 pages.
Tesla Owners Manual Model 3, "Electric Vehicle Components," retrieved from https://www.tesla.com/ownersmanual/model3/en_us/GUID-8FA15856-1720-440F-838B-ACFBA8D7D608.html Apr. 10, 2024, 2 pages.
Tesla Owners Manual Model S, "Electric Vehicle Components," retrieved from https://www.tesla.com/ownersmanual/models/en_us/GUID-8FA15856-1720-440F-838B-ACFBA8D7D608.html, Apr. 10, 2024, 2 pages.

* cited by examiner

*Primary Examiner* — Jason D Shanske
*Assistant Examiner* — James J Triggs
(74) *Attorney, Agent, or Firm* — BAKERHOSTETLER

(57) ABSTRACT

Aspects of the subject disclosure relate to an enclosure for one or more electrical components for a battery pack. The enclosure may be configured to mechanically and electrically couple to an energy volume of the battery pack. The enclosure may include an access panel. The access panel may be formed from a solid insulating structure configured to at least partially cover the one or more electrical components, and a conductive layer on a surface of the solid insulating structure. The enclosure may be a modular enclosure that can be used to provide electrical connection to any of various energy volumes including batteries or battery cells of any of various cell chemistries.

17 Claims, 23 Drawing Sheets

MODULAR ELECTRONIC COMPONENT ENCLOSURE

INTRODUCTION

Batteries are often used as a source of power, including as a source of power for electric vehicles that include wheels that are driven by an electric motor that receives power from the battery.

Aspects of the subject technology can help to improve the efficiency, serviceability, reliability, and/or range of electric vehicles, which can help to mitigate climate change by reducing greenhouse gas emissions.

SUMMARY

Aspects of the subject technology relate to a modular electronic component enclosure for a battery pack. For example, power electronics for a battery pack (e.g., having a pack frame that encloses one or more battery cells) may be housed in a separate enclosure at the rear of the battery pack. The electronic components in the separate enclosure may be serviceable by removing an access panel of the enclosure (e.g., from under a rear seat of the vehicle). The enclosure can be formed (e.g., primarily) from plastic or other insulating materials to reduce the mass and weight of the enclosure, and may be lined or coated with a conductive material, such as a foil, a coating, or a resin, to provide electromagnetic interference (EMI) protection and/or electromagnetic compatibility (EMC) properties. The enclosure may also include one or more metal layers and/or features, on or attached to a bottom plate of the enclosure, for grounding purposes. The enclosure may be modular, for mechanical and/or electrical connection to any of various energy volumes for any of various battery packs.

In accordance with aspects of the subject technology, an apparatus is provided that includes an enclosure for one or more electrical components for a battery pack. The enclosure may be configured to mechanically and electrically couple to an energy volume of the battery pack. The enclosure may include an access panel formed from a solid insulating structure configured to at least partially cover the one or more electrical components; and a conductive layer on a surface of the solid insulating structure. The surface of the solid insulating structure may include an interior surface of the solid insulating structure. The conductive layer may include at least one of: a foil, a coating, or a resin. The enclosure may also include a tray configured for mounting the one or more electrical components thereto. The tray and the access panel may be configured to at least partially enclose the one or more electrical components.

The tray may include a solid insulating tray, and the enclosure may also include at least one grounding structure coupled to the solid insulating tray. The at least one grounding structure may include a metal, and the solid insulating tray may be overmolded on the metal. The solid insulating tray may include a plurality of molded features configured for retaining the one or more electrical components. The enclosure may also include a solid insulating tub disposed between the tray and the access panel. The access panel and the tray may be configured to be attached to the solid insulating tub, and the solid insulating tub may include an additional conductive layer on a surface of the solid insulating tub. The solid insulating tub may include a plurality of ribs configured to provide structural rigidity to the solid insulating tub.

The tray may include an outer surface having a first portion configured to interface with a frame of the energy volume of the battery pack, and a second portion configured to overhang the frame of the energy volume of the battery pack. The tray may include one or more first openings in the first portion of the outer surface for accommodating one or more high voltage connectors to one or more battery cells within the frame of the energy volume, and one or more second openings in the second portion of the outer surface for accommodating one or more high voltage output connectors coupled to the one or more electrical components. The tray may include one or more third openings in the second portion, the one or more third openings configured to accommodate one or more coolant ports for the enclosure. The solid insulating tub may include a ledge for mounting a flange of one of the one or more electrical components.

The tray may include a solid insulting tray, a conductive layer on an interior surface of the tray, and molded metal on an exterior surface of the tray, and the enclosure may also include a retention structure that includes a plurality of molded features configured for retaining the one or more electrical components.

The tray may include a metal tray, and the enclosure may also include a retention structure that includes a plurality of molded features configured for retaining the one or more electrical components. The enclosure may also include a tray that includes a solid insulating structure configured for mounting the one or more electrical components thereto. The access panel may be configured to attach directly to the tray to at least partially enclose the one or more electrical components. The enclosure may also include a retention structure that includes a plurality of molded features configured for retaining the one or more electrical components within the enclosure formed by the solid insulating structure and the access panel.

In accordance with other aspects of the disclosure, a vehicle may be provided that includes a battery pack, the battery pack including an enclosure for one or more electrical components for the battery pack, the enclosure configured to mechanically and electrically couple to an energy volume of the battery pack. The enclosure may include an access panel formed from a solid insulating structure configured to at least partially cover the one or more electrical components; and a conductive layer on a surface of the solid insulating structure.

The enclosure may also include a mid-structure that includes a solid insulating structure, a conductive layer on an interior surface of the solid insulating structure, and ribbing configured to provide structural impact resistance for the enclosure. The enclosure may also include a bottom panel, the bottom panel and the access panel configured to attach to the mid-structure to form the enclosure. The enclosure may also include a support structure configured to attach to a frame of the battery pack and to an overhang on the bottom panel to provide structural impact resistance for the vehicle.

The mid-structure may also include a sealing feature for sealingly attaching the enclosure to a body structure of the vehicle. The bottom panel may also include a plurality of seals for sealing a plurality of high voltage ports between the enclosure and the battery pack.

In accordance with other aspects of the disclosure, a method of assembling a vehicle may be provided, the method including: attaching one or more electrical components to a solid insulating tray having at least one grounding structure thereon; mounting a solid insulating tub having a conductive layer to the solid insulating tray; attaching one or more additional electrical components to the solid insulating tub; forming an enclosure for the one or more electrical components and the one or more additional electrical components by attaching an access panel to the solid insulating tub; attaching the enclosure to a frame for an energy volume for a battery pack; and attaching the enclosure and the frame to one or more body structures of the vehicle.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a modular electronic component enclosure for battery packs. The modular electronic component enclosure may include an enclosure body that encloses one or more electrical and/or electronic components for distributing power from an energy volume of a battery pack. The modular electronic component enclosure may be mechanically and electrically couplable to the energy volume of any of various battery packs having various sizes and/or having battery cells of various cell chemistries. In accordance with one or more implementations of the subject technology, the modular electronic component enclosure may be formed primarily from solid lightweight and/or insulating materials, and may include conductive layers and/or elements for managing electromagnetic interference (EMI), electromagnetic compatibility (EMC) and/or grounding properties.

Figure 1A:
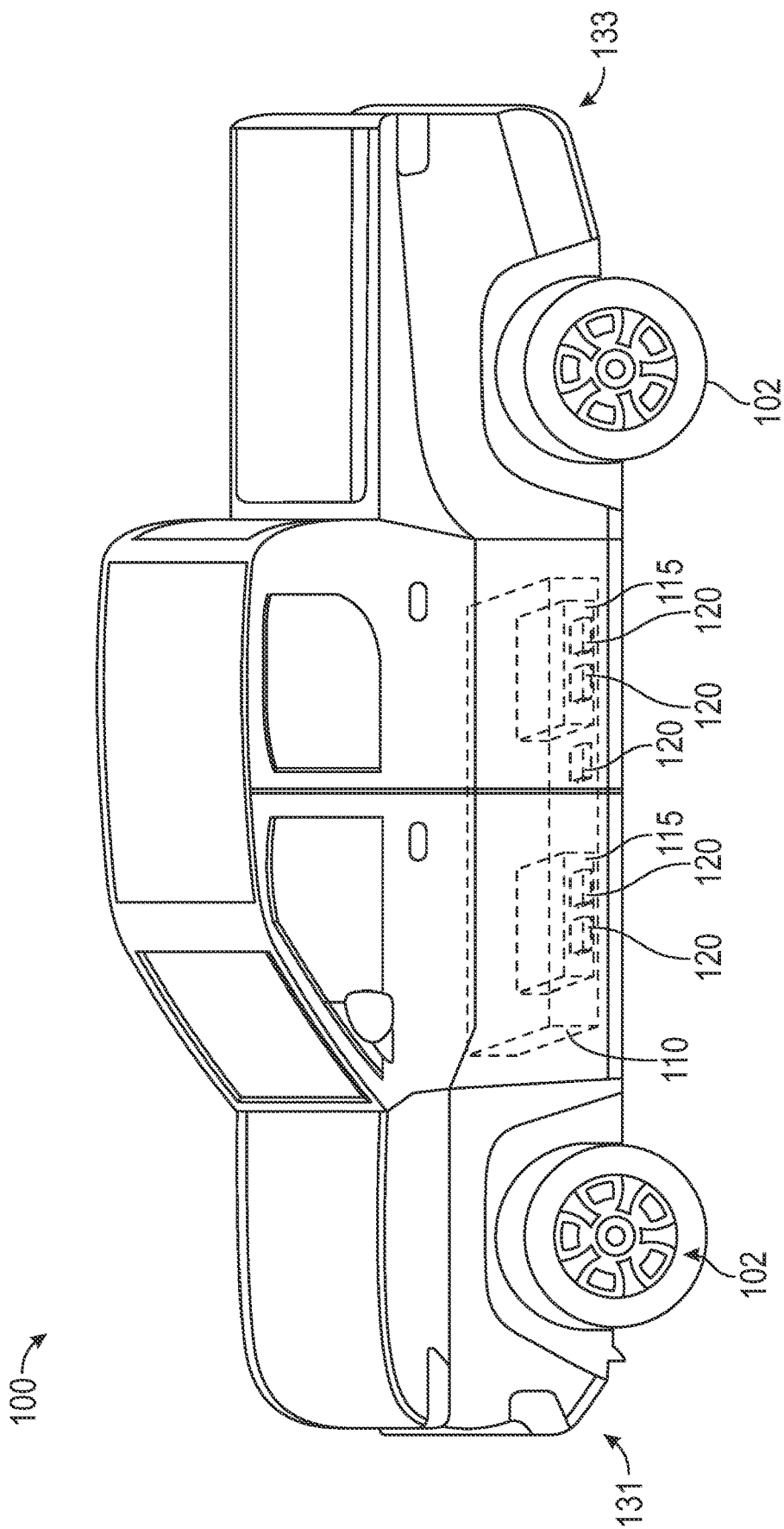
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100. The vehicle 100 may have a front end 131 and a rear end 133.

Figure 1B:
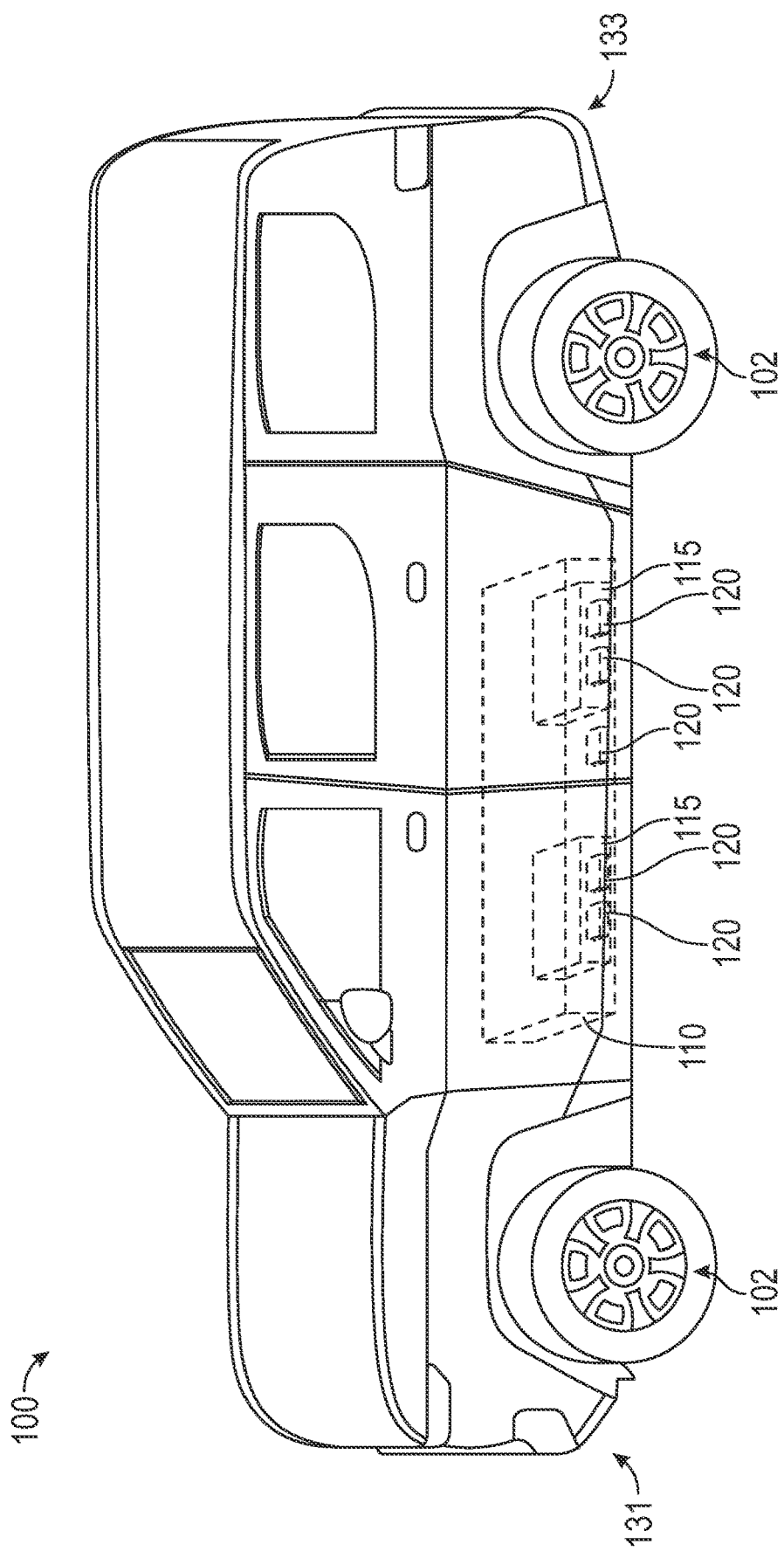

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
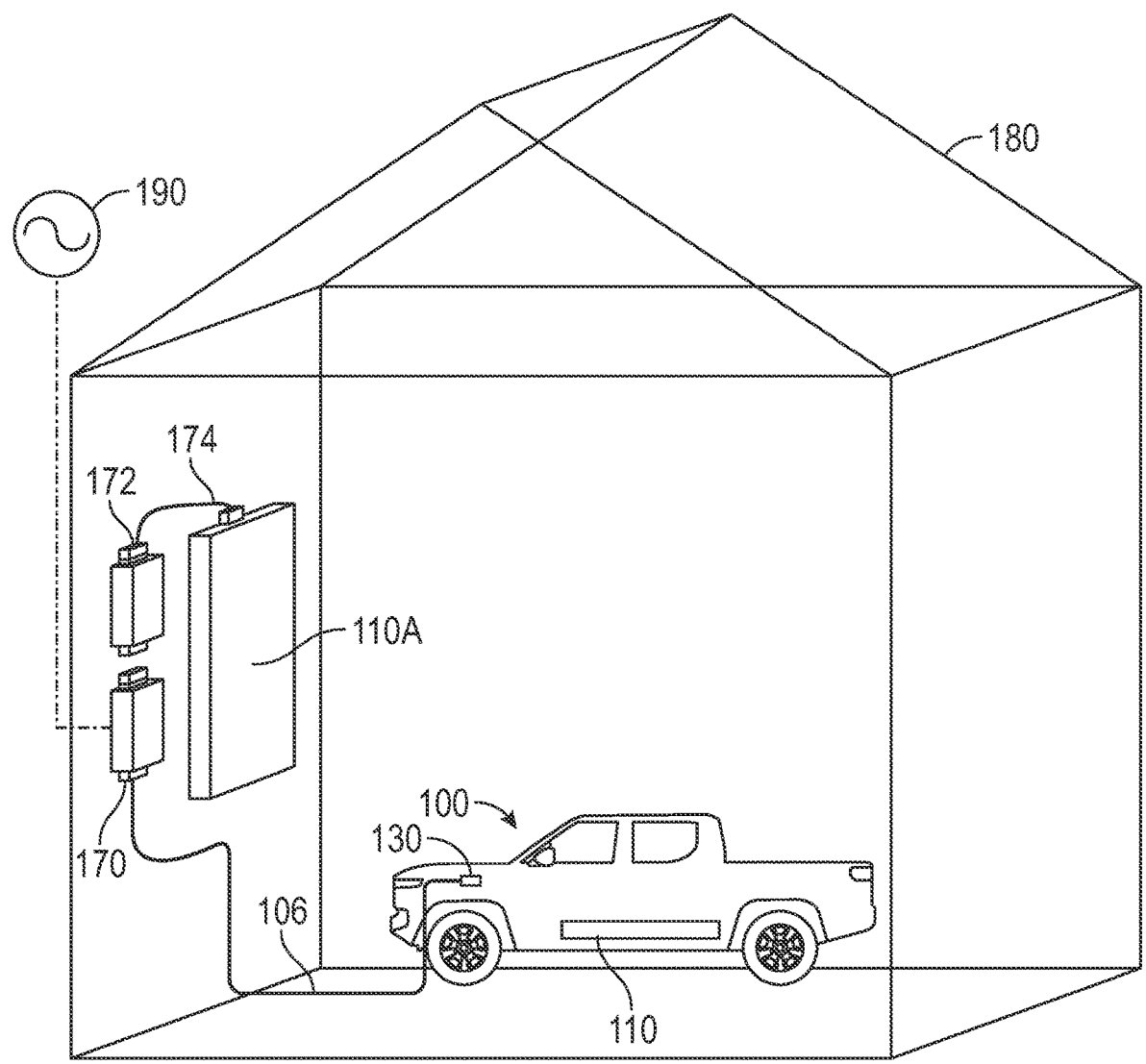
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
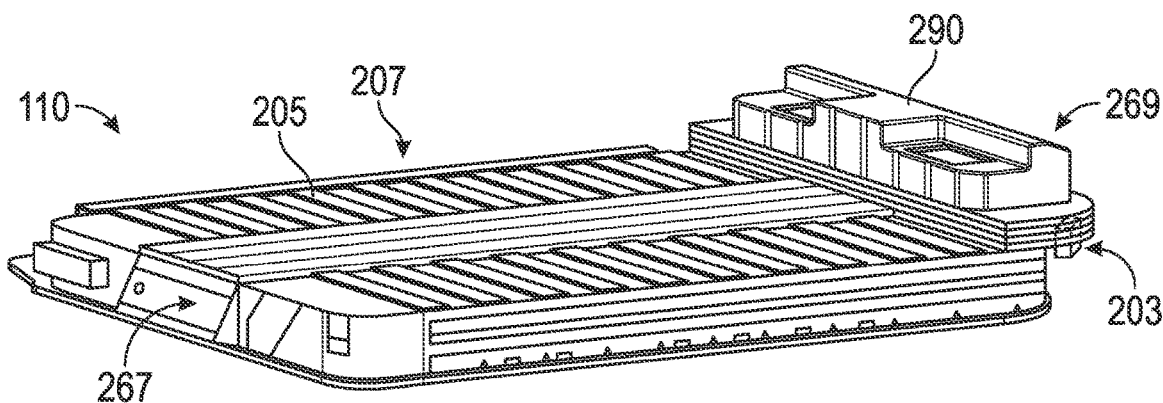
FIG. 2A illustrates a schematic perspective view of a battery pack in accordance with one or more implementations.

FIG. 2A depicts an example battery pack 110, in accordance with one or more implementations. As shown, the battery pack 110 may include a battery pack frame 205 (e.g., a battery pack housing or pack frame). For example, the battery pack frame 205 may house or enclose an energy volume 207 for the battery pack 110, the energy volume 207 including one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

Battery pack 110 may include, within the energy volume 207 and the battery pack frame 205, multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110.

As shown, the battery pack 110 may also include a modular enclosure 290 (e.g., a modular electronic component enclosure or a modular electrical component enclosure) mounted to the battery pack frame 205. In one or more implementations, the modular enclosure 290 may include one or more of the conductive coupling elements for routing power from the battery cells 120 and/or battery modules 115 within the pack frame 205 (e.g., within the energy volume 207) to one or more external connection ports, such as electrical contact 203 (e.g., a high voltage terminal, port, or connector). For example, an electrical cable or harness may be connected between the electrical contact 203 and an electrical system of the vehicle 100 or the building 180, to provide electrical power to the vehicle 100 or the building 180. The battery pack frame 205 may have a front end 267 and a rear end 269. In one or more implementations, when the battery pack 110 is installed in the vehicle 100, the battery pack 110 may be arranged with the front end 267 closer to the front end 131 of the vehicle and the rear end 269 closer to the rear end 133 of the vehicle. As shown, the modular enclosure 290 may be mounted to the pack frame 205 at or near the rear end 269 in one or more implementations.

In one or more implementations, the battery pack 110 may include one or more additional features, such as thermal control structures (e.g., cooling lines and/or plates and/or heating lines and/or plates). For example, thermal control structures may couple thermal control structures and/or fluids to the battery modules 115, battery units, batteries, and/or battery cells 120 within the battery pack frame 205, such as by distributing fluid through the battery pack 110.

For example, the thermal control structures may form a part of a thermal/temperature control or heat exchange system that includes one or more thermal components such as plates or bladders that are disposed in thermal contact with one or more battery modules 115 and/or battery cells 120 disposed within the battery pack frame 205. For example, a thermal component may be positioned in contact with one or more battery modules 115, battery units, batteries, and/or battery cells 120 within the battery pack frame 205. In one or more implementations, the battery pack 110 may include one or multiple thermal control structures and/or other thermal components for each of several top and bottom battery module pairs. As shown, the battery pack 110 may include an electrical contact 203 (e.g., a high voltage connector or port) by which an external load (e.g., the vehicle 100 or an electrical system of the building 180) may be electrically coupled to the battery modules and/or battery cells in the battery pack 110.

Figure 2B:
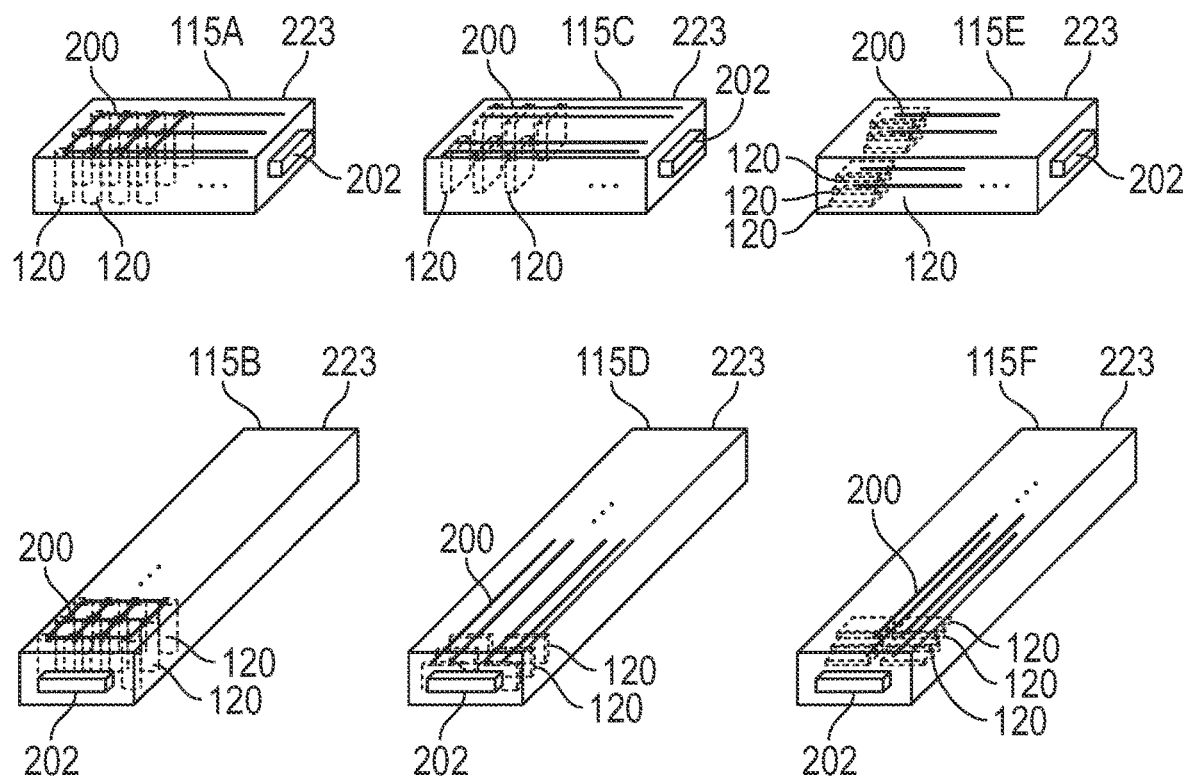
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
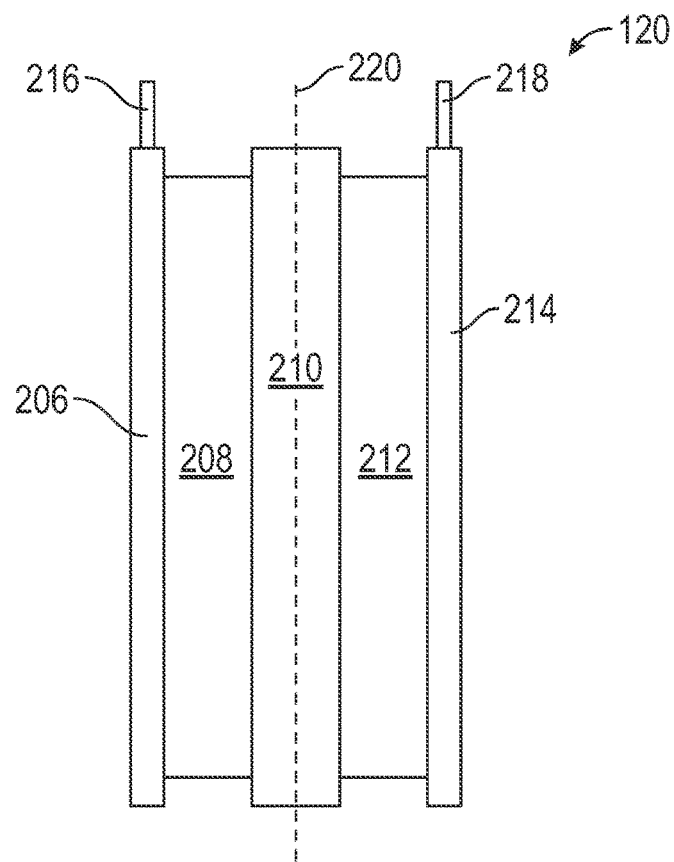
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, sodium ion battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
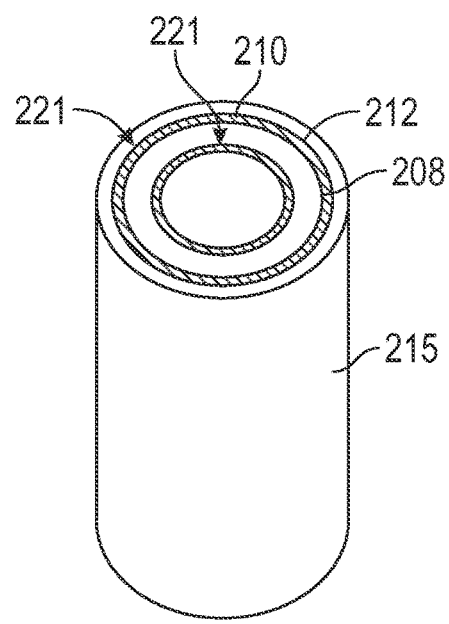
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
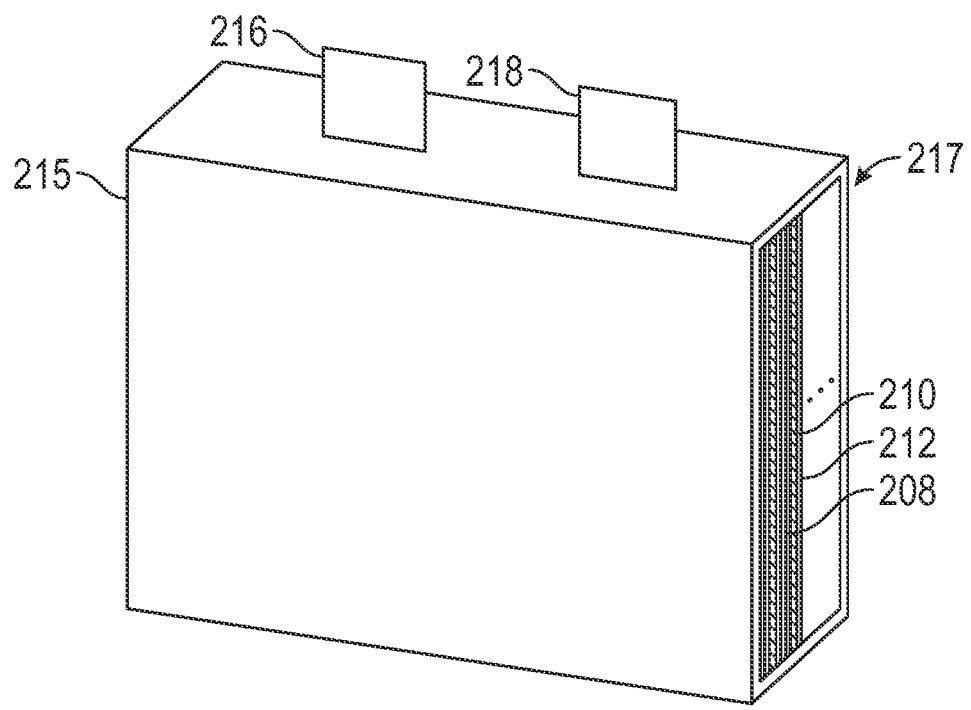
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
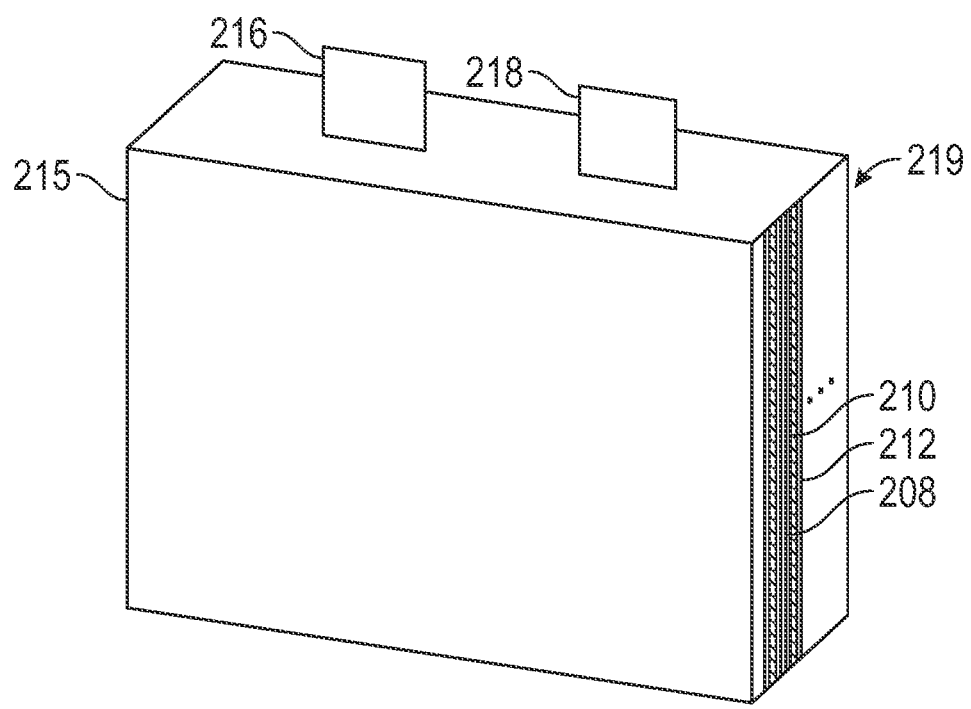
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
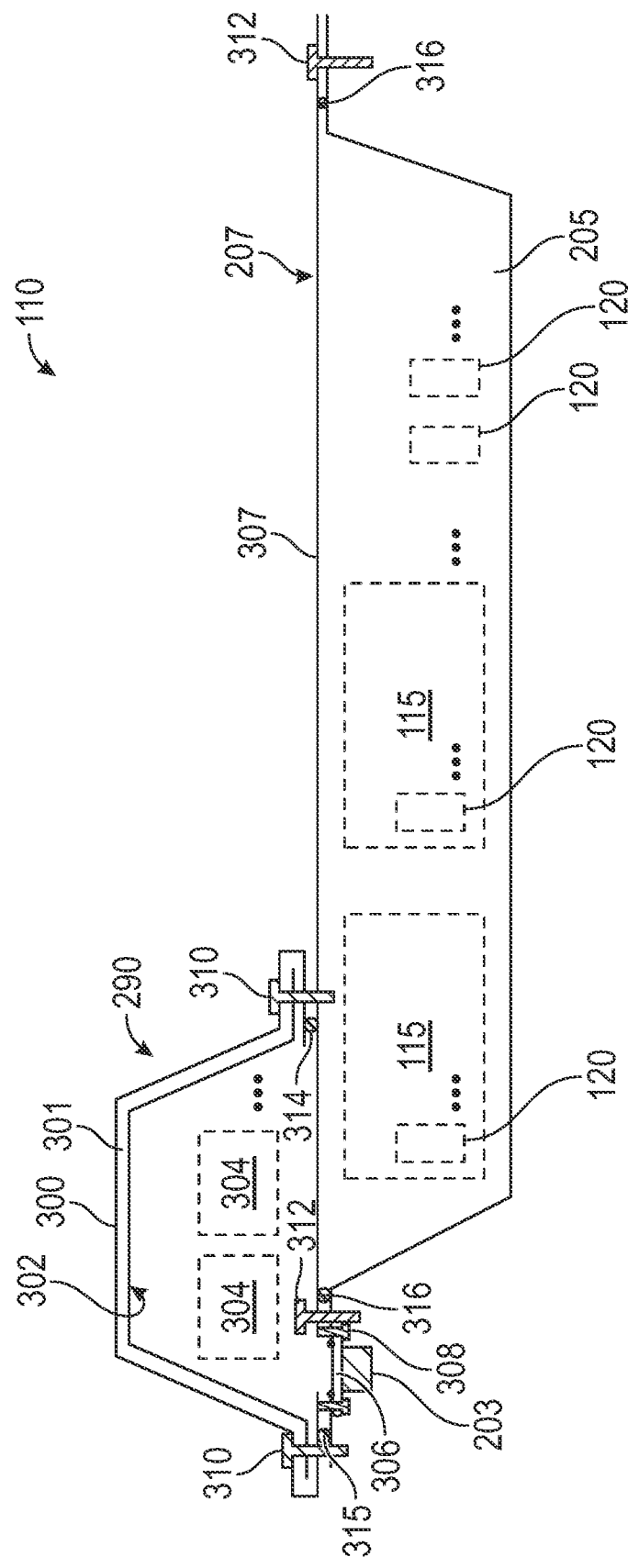
FIG. 3 illustrates a schematic cross-sectional side view of a battery pack in accordance with one or more implementations.

FIG. 3 illustrates a schematic cross-sectional side view of a battery pack in accordance with one or more implementations of the subject technology. As shown in FIG. 3, the battery pack 110 may include the energy volume 207, and the enclosure 290. As shown, the energy volume 207 may include the pack frame 205 and one or more battery modules 115 and/or battery cells 120 therewithin. The enclosure 290 may enclose, or house, one or more electrical components 304 for the battery pack 110. For example, the enclosure 290 may be configured to mechanically and electrically couple to the energy volume 207 of the battery pack 110. For example, the electrical components 304 (e.g., a high voltage distribution bus, one or more other electrical and/or electronic components, and/or the like) that are disposed within the enclosure 290 may be configured to route power (e.g., a high voltage output) from the battery modules 115 and/or battery cells 120 within the energy volume 207 to one or more ports on the enclosure, such as the electrical contact 203.

In one or more implementations, the enclosure 290 may include an access panel 300. The access panel 300 may include a solid insulating structure 301 configured to at least partially cover the electrical components 304, and a conductive layer 302 on a surface of the solid insulating structure 301. The solid insulating structure 301 may be formed from any solid insulating material including, as examples, plastic or reinforced plastic. In some implementations, the solid insulating structure 301 may include, or be replaced with, one or more conductive materials, such as magnesium.

In the example of FIG. 3, the surface of the solid insulating structure 301 that includes the conductive layer 302 is an interior surface of the solid insulating structure 301. However, in one or more other implementations, the conductive layer 302 may be provided on an outer surface of the solid insulating structure 301. In various implementations, the conductive layer 302 may be formed from a foil (e.g., a metal foil, such as an aluminum foil, compressed onto the surface), a coating (e.g., a metal coating, such as a coating formed using a vapor deposition process), or a resin (e.g., an EMI compliant resin). By forming the solid insulating structure from an insulating material with a conductive coating (or from a lighter conductive material, such as magnesium), the mass of the enclosure 290 can be reduced (e.g., relative to providing a full metal enclosure, such as a steel or aluminum enclosure, or relative to increasing the side of the pack frame 205 to enclose the electrical components), while meeting EMI and EMC specifications. This reduced mass can increase the range of an electric vehicle in which the battery pack 110 is implemented.

In the example of FIG. 3, an energy volume housing for the energy volume 207 includes the pack frame 205 and a lid 307 that enclose the battery modules 115 and/or battery cells 120. As shown, the lid 307 may be attached to the pack frame 205 by one or more fasteners 312, and a seal 316 may be provided between the lid 307 and the pack frame 205 to seal the interior of the energy volume 207 from the external environment (e.g., from liquid ingress).

As shown, the enclosure 290 may be removably attached to the energy volume 207 (e.g., to the pack frame 205 and/or the lid 307). In the example of FIG. 3, the enclosure 290 is attached to the energy volume 207 by fasteners 310 (e.g., bolts) that pass through portions of the access panel 300 into the lid 307 and/or the pack frame 205. A seal 314 may be provided between the enclosure 290 and the energy volume 207 (e.g., between the enclosure 290 and the lid 307 and/or the pack frame 205). Because the electrical components 304 are provided in an enclosure 290 that is removably attachable to the energy volume 207, the enclosure and its electrical components 304 can be installed, serviced, and/or leak checked separately from the battery modules 115 and/or battery cell 120, without affecting EMI/EMC, grounding, and structural performance. For example, the enclosure 290 and its electrical components 304 may be assembled and tested separately for electrical and leak checks.

Providing an enclosure 290 for the electrical components 304 that is removably attachable to the energy volume 207 allows the enclosure to be modular, and useable (e.g., for voltage distribution) with any of various different types of energy volume, regardless of cell chemistry of the battery cells 120 therein or the size of the battery pack frame 205. The enclosure 209 may be scaled up or down depending on the magnitude of force and/or EMI specifications for a particular battery pack. Advantages of providing the enclosure 290 can include having a single electronic box that is pre-assembled with different configurations depending on the type of the vehicle and/or the chemistry of the cell technology used in the battery packs.

The enclosure 290 may provide benefits for serviceability of the battery pack 110, and/or a vehicle in which the battery pack 110 is implemented. For example, as shown in FIG. 3, the access panel 300 may be removed (e.g., by removing the fasteners 310), allowing access to the electrical components 304 without opening the energy volume 207 (e.g., without opening the lid 307 or otherwise exposing the battery modules 115 and/or battery cells 120). In one or more implementations, the battery pack 110 may be installed in the vehicle 100 such that the enclosure 290 is disposed beneath a seat (e.g., a rear seat) of the vehicle. In this way, the electrical components 304 may be serviceable from within the passenger compartment of the vehicle (e.g., by removing or displacing a bottom cushion assembly of the rear seat and removing or opening the access panel 300).

In one or more implementations, the enclosure 290 provides a single enclosure for the electrical components 304 of the battery pack 110, and acts as a shield for EMI/EMC. In one or more implementations, the enclosure 290 is provided in a modular form that can be connected to energy volumes of various sizes and that include battery cells of any of various cell chemistries.

In the example of FIG. 3, a portion of the enclosure 290 is disposed on the lid 307, and a portion of the enclosure 290 overhangs the end of the lid 307. For example, a portion of the enclosure 290 may be located outward of the seal 316 between the lid and the pack frame 205. In this example, the enclosure 290 may be sealingly attached to the energy volume 207, such as by providing a seal 314 between the access panel 300 and the lid 307, and a seal 315 between the access panel 300 and the pack frame 205. In the example of FIG. 3, the electrical contact 203 (e.g., a high voltage port) is disposed on the portion of the enclosure 290 that overhangs the end of the lid 307. As shown, a grounding structure 306 may be attached to the pack frame 205 and/or the access panel 300, to provide grounding for the electrical contact 203 and/or the electrical components 304. In the example of FIG. 3, the grounding structure 306 is formed from a metal plate that is fastened to the pack frame 205 and/or the access panel 300 using one or more fasteners 308. However, this is merely illustrative, and in other implementations, a grounding structure for the enclosure 290 may be formed in other ways, such as by a metal overmold on a portion of the enclosure 290, as described in further detail hereinafter.

Figure 4:
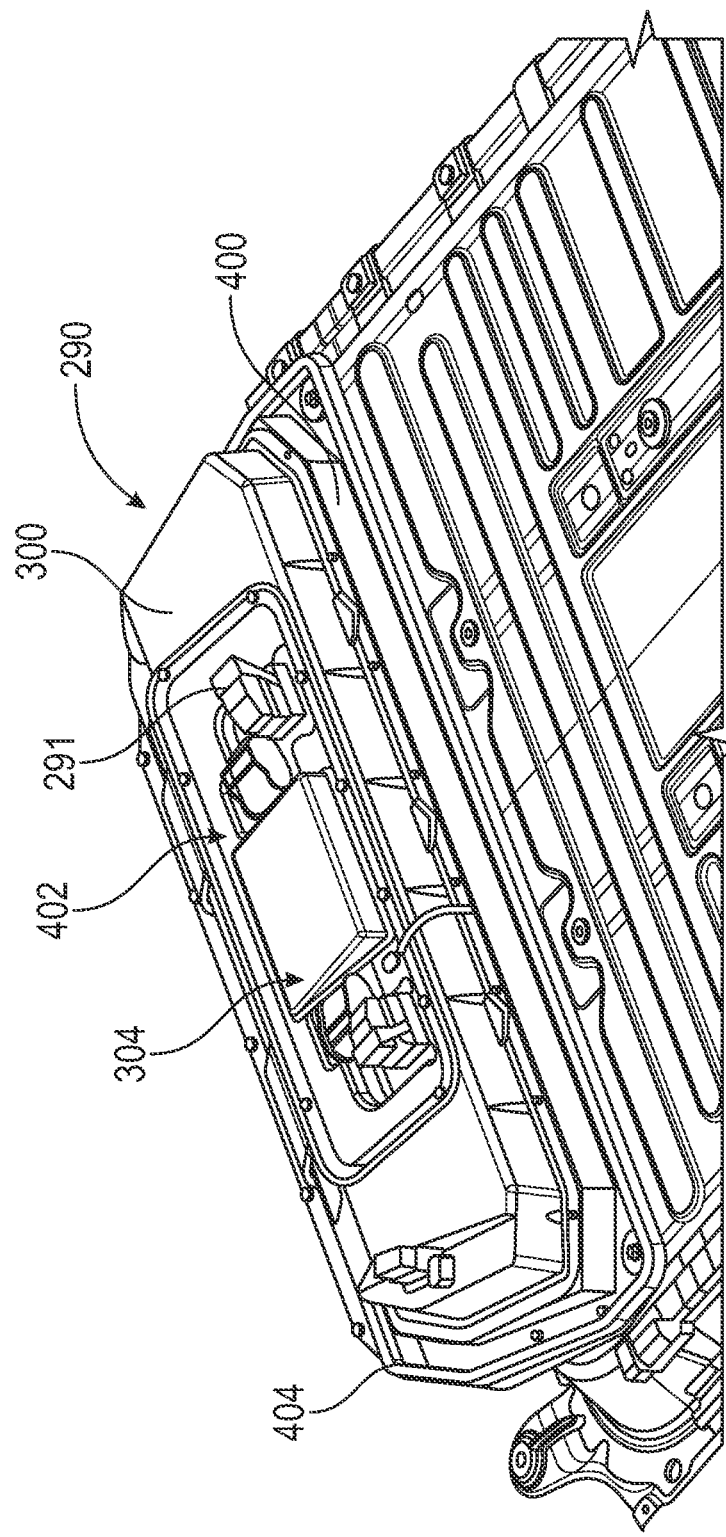
FIG. 4 illustrates a top perspective view of a portion of a battery pack in accordance with one or more implementations.

In the example of FIG. 3, the enclosure 290 is formed from a single solid insulating structure 301 with a conductive layer 302. However, this arrangement of the enclosure 290 is merely illustrative, and other implementations of the enclosure 290 are contemplated herein. For example, FIG. 4 shows another exemplary implementation of the enclosure 290. In the example of FIG. 4, the enclosure 290 is attached to the pack frame 205. In this example, rather than attaching the access panel 300 directly to the pack frame 205, the access panel 300 is attached to a solid insulating tub 400. As shown, the solid insulating tub 400 may include a seal 404. The seal 404 may be configured, for example, to interface with a body structure of a vehicle, such as vehicle 100. In this way, the seal 404 may sealingly separate the access panel 300 from a portion of the vehicle that can be exposed to environmental conditions (e.g., from an underside of the vehicle). In this way, the access panel 300 may be located in a "dry zone" of the vehicle 100.

In the example of FIG. 4, the access panel 300 includes an opening 402. As shown, the opening 402 may provide access to one or more additional connectors or ports for the battery pack 110, such as one or more connectors 291 (e.g., electrical ports, terminals, and/or contacts). For example, the connector(s) 291 may be low-voltage connectors to a low-voltage source within the enclosure 290. The access panel 300 may be removed (e.g., by detaching the access panel 300 from the solid insulating tub 400) to provide access (e.g., for servicing) one or more other electrical components 304, within the enclosure 209, that are not visible in FIG. 4. The access panel 300 may be removed from the enclosure 290 without detaching the solid insulating tub 400 from the pack frame 205.

Figure 5:
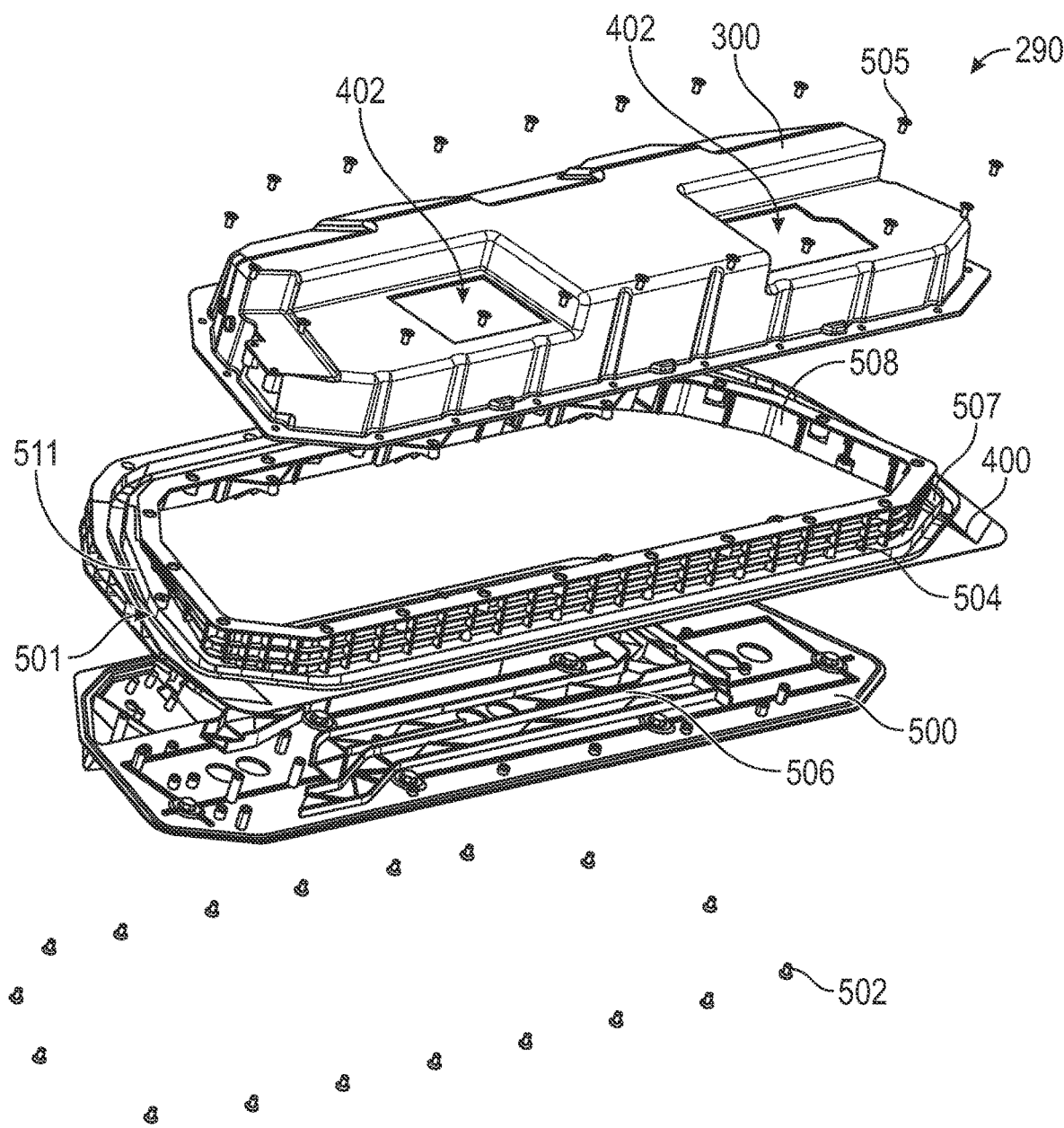
FIG. 5 illustrates an exploded perspective view of a modular enclosure for one or more electrical components for a battery pack in accordance with one or more implementations.

FIG. 5 illustrates an exploded perspective view of the enclosure 290, in accordance with one or more implementations. As shown in FIG. 5, the access panel 300 may be provided with one or more openings 402 (e.g., for providing access to one or more connectors 291 or other connections to the electrical components 304). As shown, the solid insulating tub 400 may form a peripheral wall 501 for the enclosure 290. The solid insulating tub 400 may be provided with a conductive layer 508 on a surface thereof. In the example of FIG. 5, the conductive layer 508 is formed on an interior surface of the solid insulating tub. However, in one or more other implementations, the conductive layer 508 may be formed on an exterior surface of the solid insulating tub.

In various implementations, the conductive layer 508 may be formed from a foil (e.g., a metal foil, such as an aluminum foil, compressed onto the surface), a coating (e.g., a metal coating, such as a coating formed using a vapor deposition process), or a resin (e.g., an EMI compliant resin). By forming the solid insulating tub 400 from an insulating material with a conductive layer 508 (or from a lighter metal, such as magnesium), the mass of the enclosure 290 can be reduced (e.g., relative to providing a full metal enclosure, such as a steel or aluminum enclosure, or relative to increasing the side of the pack frame 205 to enclose the electrical components), while meeting EMI and EMC specifications. This reduced mass can increase the range of an electric vehicle in which the battery pack 110 is implemented. The solid insulating tub 400 may include one or more ribs 504 (e.g., on the peripheral wall 501). The ribs 504 may be configured to provide structural rigidity to the solid insulating tub. In this way, the enclosure 290 may be provided with a structural rigidity, and can be integrated as a structural component of a vehicle, such as the vehicle 100, in one or more implementations. A groove 511 may be provided on a surface (e.g., a top surface) of the peripheral wall 501 of the solid insulating tub 400. For example, the groove 511 may be configured to receive (e.g., to be filled with) a sealing material for forming the seal 404 of FIG. 4.

As shown in FIG. 5, the enclosure 290 may also include a tray 500. The tray 500 may be configured for mounting one or more of the electrical components 304 thereto, and the tray 500 and the access panel 300 may be configured to at least partially enclose the electrical components 304. As shown, the solid insulating tub 400 may be disposed between the tray 500 and the access panel 300. For example, the access panel 300 and the tray 500 may be attached to the solid insulating tub 400 (e.g., to opposing sides, such as top and bottom sides, of the solid insulating tub 400). In one or more implementations, the tray 500 may include one or more features 506 (e.g., molded features, such as channels, sub-walls, brackets, etc.). For example, the features 506 may be configured for retaining, supporting, securing, or mounting one or more of the electrical components 304 (e.g., including cables, busbars, etc.). In the example of FIG. 5, the tray 500 is a molded structure (e.g., an insulating structure, such as a molded plastic structure), and the features 506 are integral molded features of the molded structure.

As illustrated in FIG. 5, the access panel 300 may be attached to the solid insulating tub 400, such as by fasteners 505 (e.g., bolts, screws, or other fasteners) around the periphery of the access panel 300. The tray 500 may be attached to the solid insulating tub 400, such as by fasteners 502 (e.g., bolts, screws, or other fasteners) around the periphery of the tray 500. Providing a separate solid insulating tub 400 between the tray 500 and the access panel 300 may facilitate installation of the electrical components 304 into the enclosure 290 (e.g., by providing additional space and flexibility for installing some of the electrical components 304 on the tray prior to attaching the solid insulating tub 400 to the tray 500).

Figure 6:
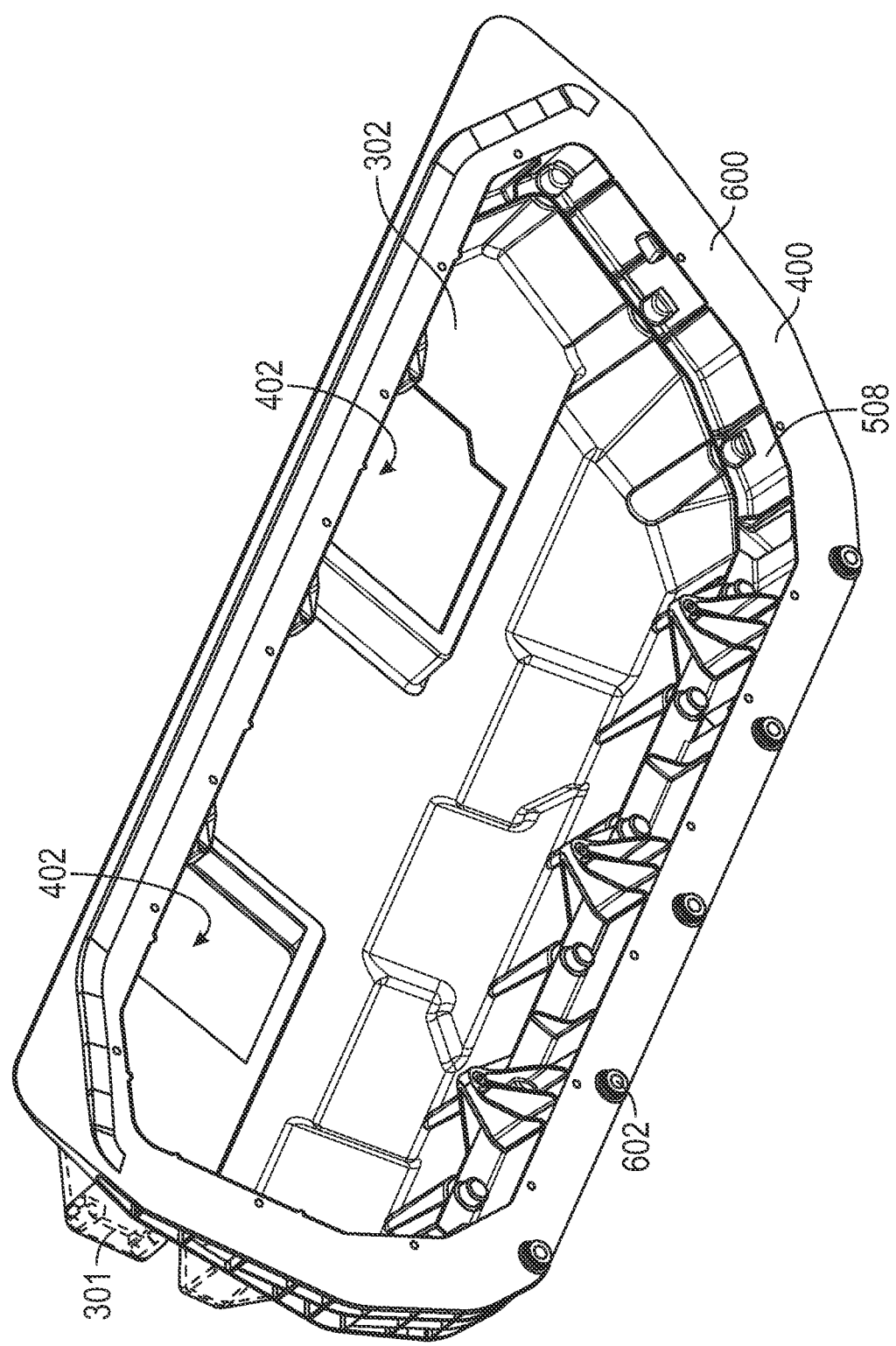
FIG. 6 illustrates a bottom perspective view of a subassembly of a modular enclosure for one or more electrical components for a battery pack in accordance with one or more implementations.

FIG. 6 illustrates a bottom perspective view of a subassembly of the enclosure 209, in which the solid insulating tub 400 is attached to the access panel 300. In the bottom view of FIG. 6, the openings 402, as well as the conductive layer 302 on the interior surface of the access panel 300 and the conductive layer 508 on the interior surface of the solid insulating tub 400 can be seen. The solid insulating tub 400 may include a bottom surface 600, at least a portion of which is configured to interface with the tray 500. The bottom surface 600 of the solid insulating tub 400 may include one or more features 602 (e.g., protrusions and/or openings) that are configured for attachment of the solid insulating tub 400 (and thereby the enclosure 290) to a body structure of a vehicle, such as vehicle 100.

Figure 7A:
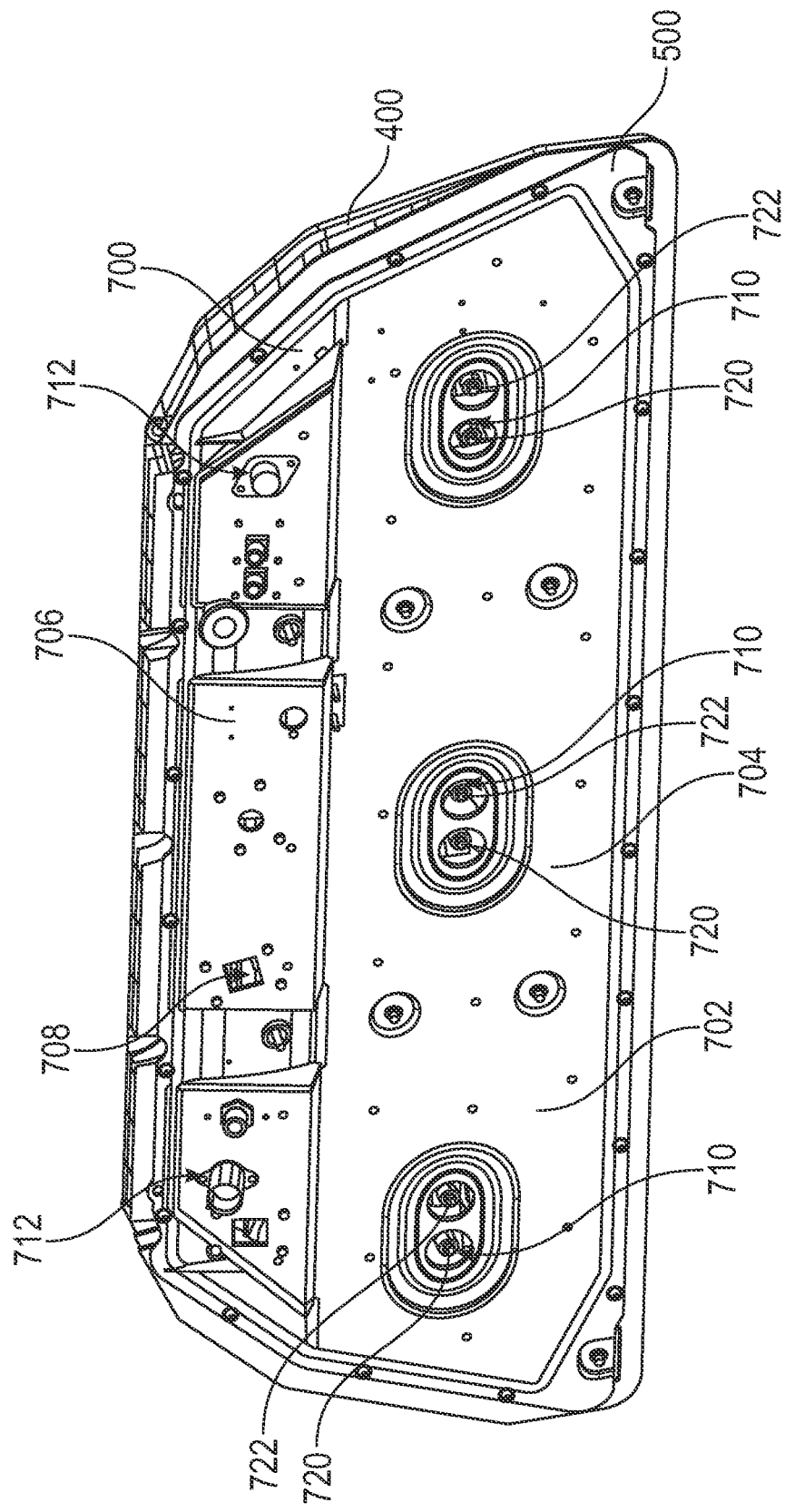
FIG. 7A illustrates a bottom perspective view of a modular enclosure for one or more electrical components for a battery pack in accordance with one or more implementations.

FIG. 7A illustrates a bottom perspective view of the enclosure 290 of FIG. 5 in accordance with one or more implementations. In the example of FIG. 7A, a bottom surface of the tray 500 can be seen. As shown, the tray 500 may be formed from a solid insulating tray 700 that is overmolded onto a grounding structure 702. For example, the grounding structure 702 may include a metal layer over which a moldable material (e.g., plastic) is overmolded to form the solid insulating tray 700 with the metal layer molded thereto.

In one or more implementations, the tray 500 may include an outer surface (e.g., the bottom surface that is visible in FIG. 7A) having a first portion 704 that is configured to interface with a frame (e.g., pack frame 205) of the energy volume 207 of the battery pack 110, and a second portion 706 that is configured to overhang the frame of the energy volume 207 of the battery pack. As shown, the tray 500 may include one or more first openings 710 in the first portion 704 of the outer surface. For example, the first openings 710 may be configured for accommodating one or more high voltage and/or low voltage feedthroughs between the enclosure 290 and the energy volume 207. For example, as shown in FIG. 7A, one or more high voltage terminals, such as a high voltage terminal 720 (e.g., a negative high voltage terminal, such as a cylindrical negative high voltage terminal) and a high voltage terminal 722 (e.g., a positive high voltage terminal, such as a cylindrical positive high voltage terminal) may be provided in each of the openings 710 to couple one or more high voltage sources within the energy volume 207 to one or more of the electrical components 304 within the enclosure 290. Although not visible in FIG. 7A, one or more low-voltage connectors may also be provided for feedthrough between the energy volume 207 and the enclosure 290 (as described in further detail hereinafter). The tray 500 may include one or more second openings 708 in the second portion 706 of the outer surface. The second openings 708 may be configured for accommodating one or more high voltage output connectors coupled to the one or more electrical components 304. The tray 500 may also include one or more third openings 712 in the second portion 706. The one or more third openings 712 may be configured to accommodate one or more coolant ports for the enclosure 290.

Figure 7B:
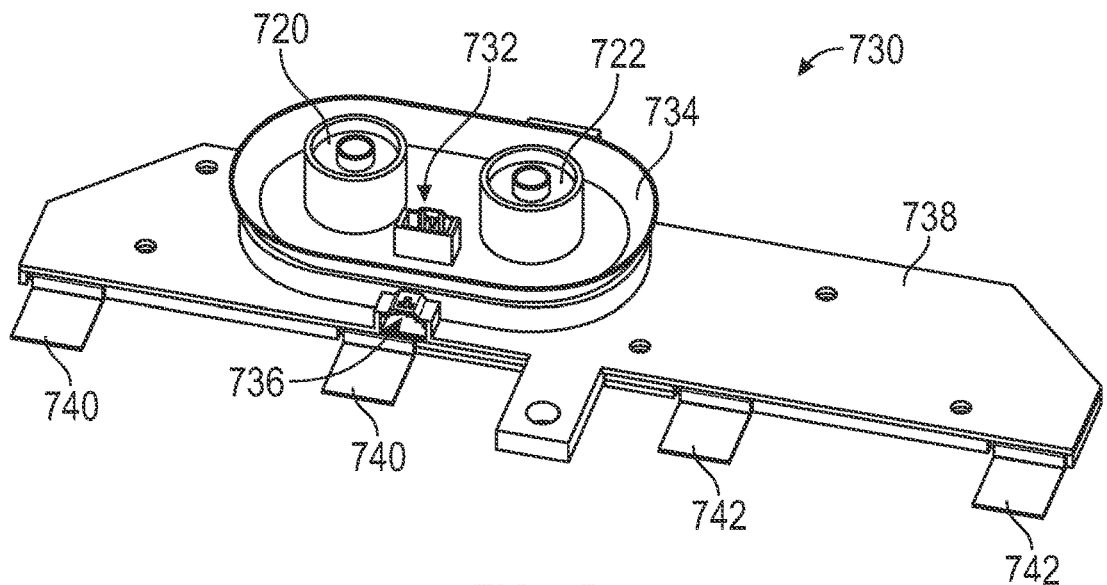
FIG. 7B illustrates a perspective view of an assembly for high and low voltage feedthrough for a modular enclosure in accordance with one or more implementations.

FIG. 7B illustrates an example implementation of an assembly 730 that may be provided within the enclosure 290 to allow high voltage (HV) bussing and low voltage (LV) signals to pass through a sealed interface between the energy volume 207 and the enclosure 290. As shown, the assembly 730 may include a seal 734 that extends around the HV terminal 720 and the HV terminal 720. For example, the seal 734 may be pressed against an internal surface of the tray 500 to provide an internal seal, within the enclosure 290, around an opening 710 in which the assembly 730 is mounted (e.g., to position the HV terminals 720 and 722 as HV feedthroughs within the opening 710). As shown, a low voltage connector 732 may also be provided within the seal 734. For example, the low voltage connector 732 may be implemented as a multi-pin (e.g., eight-pin) connector that is molded into the housing 738 at a location within the seal 734. When the enclosure 290 is mounted to the pack frame 205, the HV terminals 720 and 722 may be coupled with a high voltage source within the energy volume 207 and configured to route power from the high voltage source within the energy volume 207 to high voltage components within the enclosure 290. When the enclosure 290 is mounted to the pack frame 205, the LV connector 732 may be coupled, via an opening 710 in the tray 500, to a cable within the energy volume 207 and may be configured to route low voltage signals between the enclosure 290 and the energy volume 207. For example, in one or more implementations, a low-voltage cable within the enclosure 290 may be connected to a low voltage connector 736 that includes pins that are electrically coupled to the pins of the low voltage connector 732.

As shown, the seal 734 may be mounted to and/or extend from a housing 738 of the assembly 730. As shown, one or high voltage contacts 740 may extend from the housing 738 and may be electrically coupled to the HV terminal 720. The HV contacts 740 may be coupled one or more high voltage electrical components within the enclosure 290. One or high voltage contacts 742 may extend from the housing 738 and may be electrically coupled to the HV terminal 722. The HV contacts 742 may be coupled one or more high voltage electrical components within the enclosure 290.

Figure 7C:
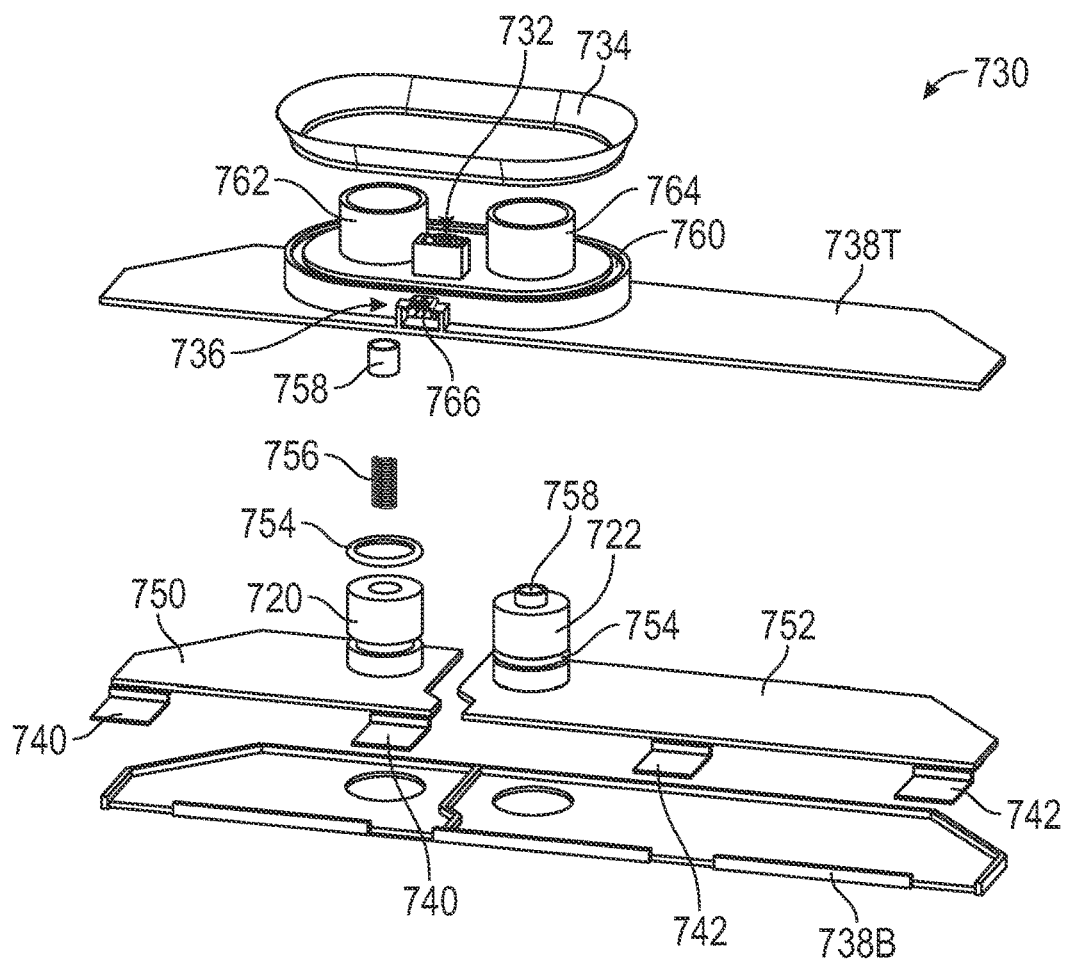
FIG. 7C illustrates an exploded perspective view of the assembly of FIG. 7B in accordance with one or more implementations.

FIG. 7C illustrates an exploded perspective view of the assembly 730 of FIG. 7B. As shown in FIG. 7B, the housing 738 of the assembly 730 may include a top housing 738T and a bottom housing 738B. The top housing 738T and the bottom housing 738 B may cooperate to enclose a busbar 750 and a busbar 752 of the assembly 730. HV contacts 740 and/or HV contacts 742 may be formed, for example, from one or more foils or other metal layers welded to the busbars 750 and 752, respectively. As shown, the busbar 750 may electrically connect the high voltage contacts 740 to the high voltage terminal 720. The busbar 752 may connect the high voltage contacts 742 to the high voltage terminal 722. For example, HV contacts 740 and/or HV contacts 742 may be formed, for example, from one or more foils (e.g., 0.6 mm thick welding foils) or other metal layers welded to the busbars 750 and 752, respectively.

In one or more implementations, the electrical joint between the foils and the busbars may have a resistance of less than 20μΩ. In one or more implementations, the electrical joint between the cylindrical terminals (e.g., HV terminals 720 and 722) and the busbars may have a resistance of less than 20μΩ. In one or more implementations, the foils, the busbars, and the terminals may support a continuous current of as much as, or more than, 250-300 A. As shown, the top housing 738T may include the low voltage connector 732, the low voltage connector 736, and a feature (e.g., a groove 760) configured to receive the seal 734. In the example of FIG. 7C, pins 766 of the low voltage connector 736 can be seen.

Figure 7D:
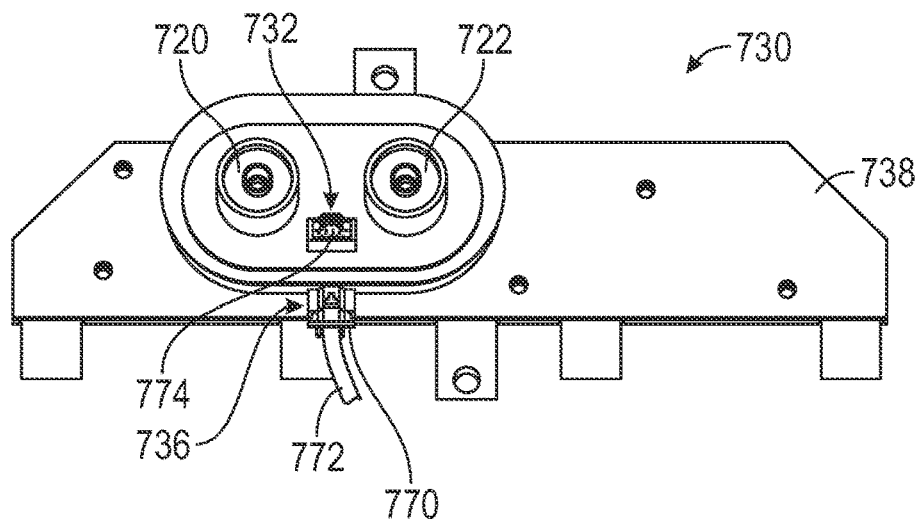
FIG. 7D illustrates a top view of the assembly of FIG. 7B in accordance with one or more implementations.

FIG. 7C also illustrates how the assembly 730 may include one or more sealing features (e.g., O-rings 754) configured to seal the high voltage terminal 720 and the high voltage terminal 722 to an internal surface of the top housing 738T. For example, the top housing 738T may include an extension 762 and an extension 764 that are configured to receive, respectively, the high voltage terminal 720 (e.g., with an O-ring 754) and the high voltage terminal 722 (e.g., with an O-ring 754). As shown, the assembly 730 may also include one or more touch protectors 758 (e.g., IPXXB touch protectors) for the high voltage terminal 720 and the high voltage terminal 722. In one or more implementations, a threaded insert 756 may be provided within each of the cylindrical high voltage terminals for securing a touch protector 758 to that terminal. FIG. 7D illustrates a top view of the assembly 730 of FIGS. 7B and 7C, in which a cable 772 is connected to the low voltage connector 736 (e.g., via a mating connector 770 for the low voltage connector). Pins 774 of the low voltage connector 732 are also visible in FIG. 7D. In this way, the assembly 730 may provide signal paths for multiple (e.g., eight, less than eight, or more than eight) low voltage communication signals to be passed through between the energy volume 207 and the enclosure 290.

Figure 7E:
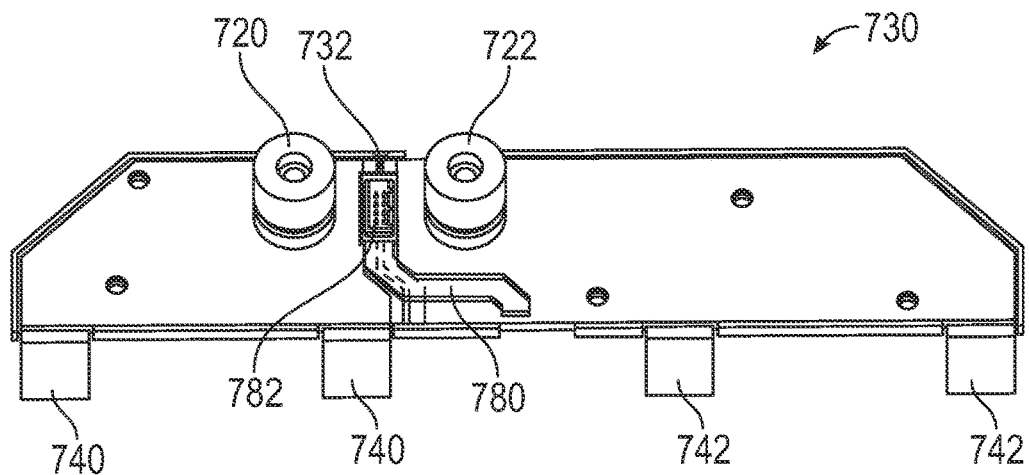
FIG. 7E illustrates a top perspective view of another implementation of an assembly for high and low voltage feedthrough for a modular enclosure, with a top housing removed, in accordance with one or more implementations.
Figure 7F:
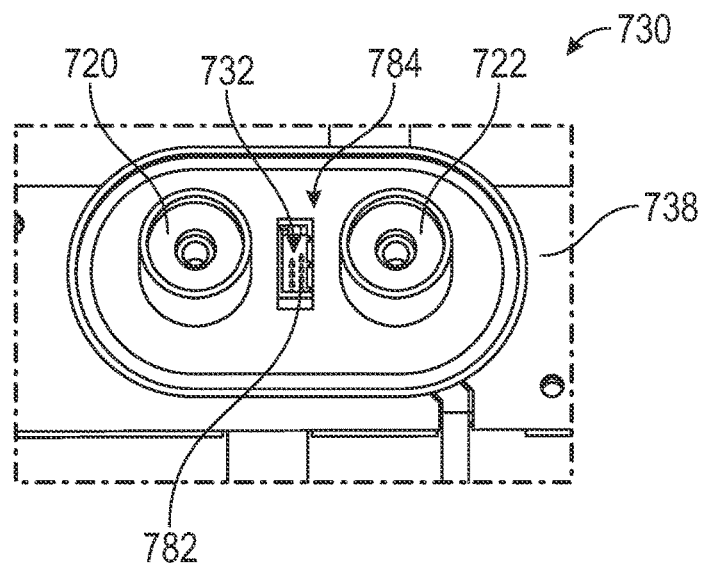
FIG. 7F illustrates a top perspective view of a portion of the assembly of FIG. 7E with the top housing installed, in accordance with one or more implementations.

In the examples of FIGS. 7B-7D, the low voltage connector 732 is implemented using molded-in connector pins (e.g., pins 774) inside the top housing 738T. However, this is merely illustrative, and other implementations of the low voltage connector are contemplated. For example, FIG. 7E illustrates another implementation of the assembly 730 (with the top housing 738T removed for clarity) in which the low voltage connector 732 is implemented using connector pins 782 directly mounted onto a stiffener with a flex circuit 780. As shown, in FIG. 7F, when the top housing 738T is installed, the connector pins 782 and the flex circuit 780 may be assembled between the top housing 738T and the bottom housing 738B, and the connector pins 782 may be accessible via an opening 784 in the top housing 738T. In this example, the top housing 738T and the bottom housing 738B may provide a retention, location, channel, and/or routing path for the flex circuit 780.

In the examples of FIGS. 7B-7F, the assembly 730 provides three seals, including two O-rings 754 around the terminals 720 and 722, and one lid seal (e.g., seal 734). These seals may prevent ingress of liquid or other debris from the external environment from entering the enclosure 290 or the pack frame 205 via the openings 710. In one or more implementations, these seals may each meet IP69 seal standards, may be formed from polyurethane, epoxy, acrylic, and/or silicone adhesives (as examples), may be configured to maintain a seal in temperatures of between −40° C. and 100° C., and/or may have a maximum leak rate of 3 SCCM at −0.5 PSIG under all tolerance conditions. The seal 734 may have a Z-tolerance to the tray 500 of +/−2 mm, a nominal Z-space available of 4 mm, a lid flatness tolerance of 1 mm, and a maximum seal compression force of 12 kgf, in one or more implementations. In one or more implementations, the assembly 730 may have a width of between 200 mm and 400 mm, a length of between 50 mm and 170 mm, and/or a height of between 25 mm and 50 mm.

Figure 8:
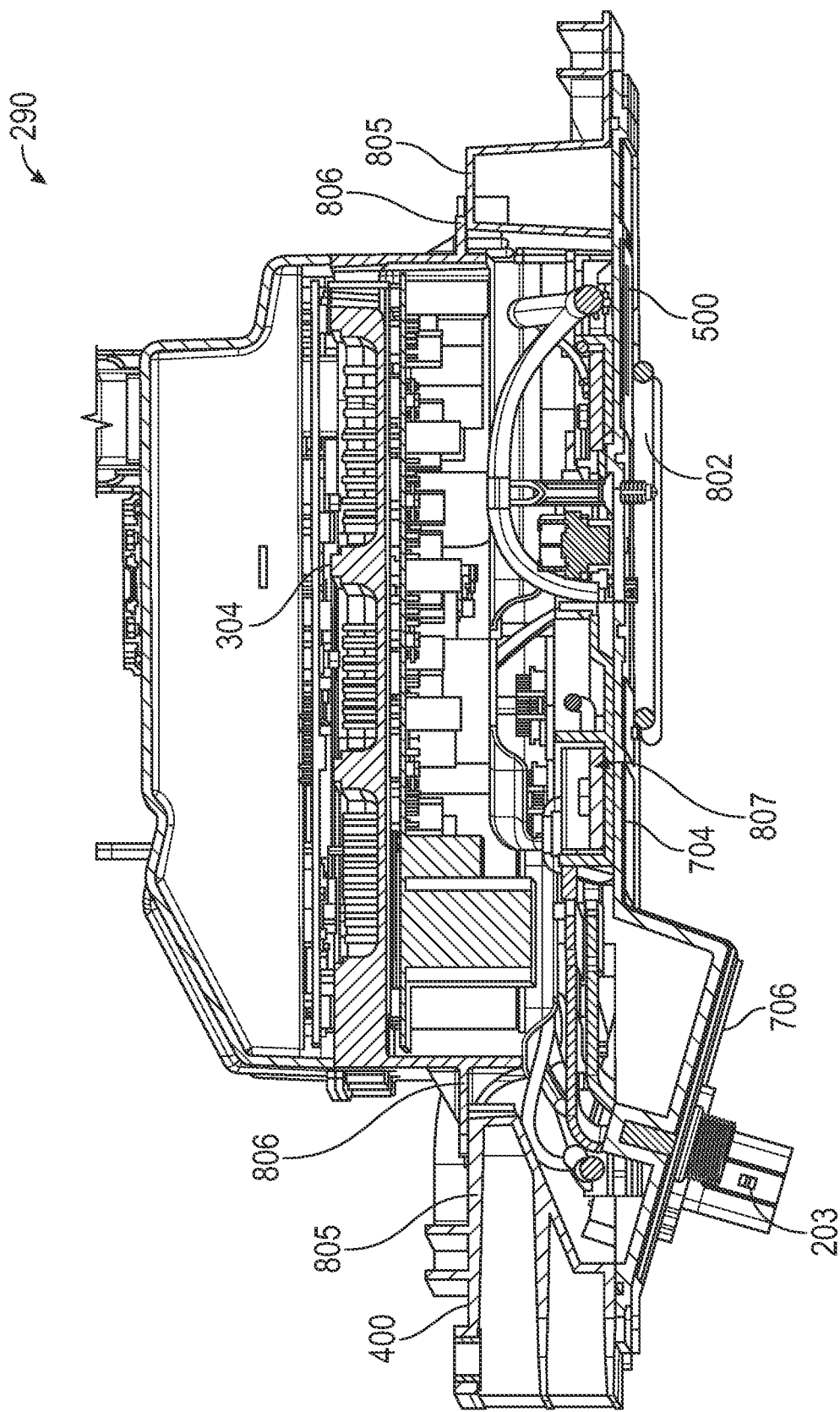
FIG. 8 illustrates a cross-sectional side view of a modular enclosure for one or more electrical components for a battery pack in accordance with one or more implementations.

FIG. 8 illustrates a cross-sectional side view of the enclosure of FIG. 4, with the electrical components 304 installed therein and the access panel 300 removed. As shown, the solid insulating tub 400 may include a ledge 805. The ledge 805 may be configured for mounting a flange 806 of one of the electrical components 304. By mounting the one of the electrical components 304 to the ledge 805, a gap 807 may be provided between the one of the electrical components 304 and the tray 500. One or more additional electrical components 304 (e.g., including cables, busbars, etc.) and/or one or more thermal features (e.g., cold plates, fluid lines, etc.) may be mounted within the gap 807 (e.g., mounted to the mounting features 506 on the tray 500). FIG. 8 also shows how the enclosure 290 may include one or more sealing features 802 configured to provide a seal around the high-voltage connectors to the energy volume 207. FIG. 8 also illustrates how the second portion 706 of the tray 500 may have a shape that is configured to overhang an edge of the pack frame 205, and how the electrical contact 203 (e.g., a high-voltage output connector) may be provided on the second portion 706.

Figure 9:
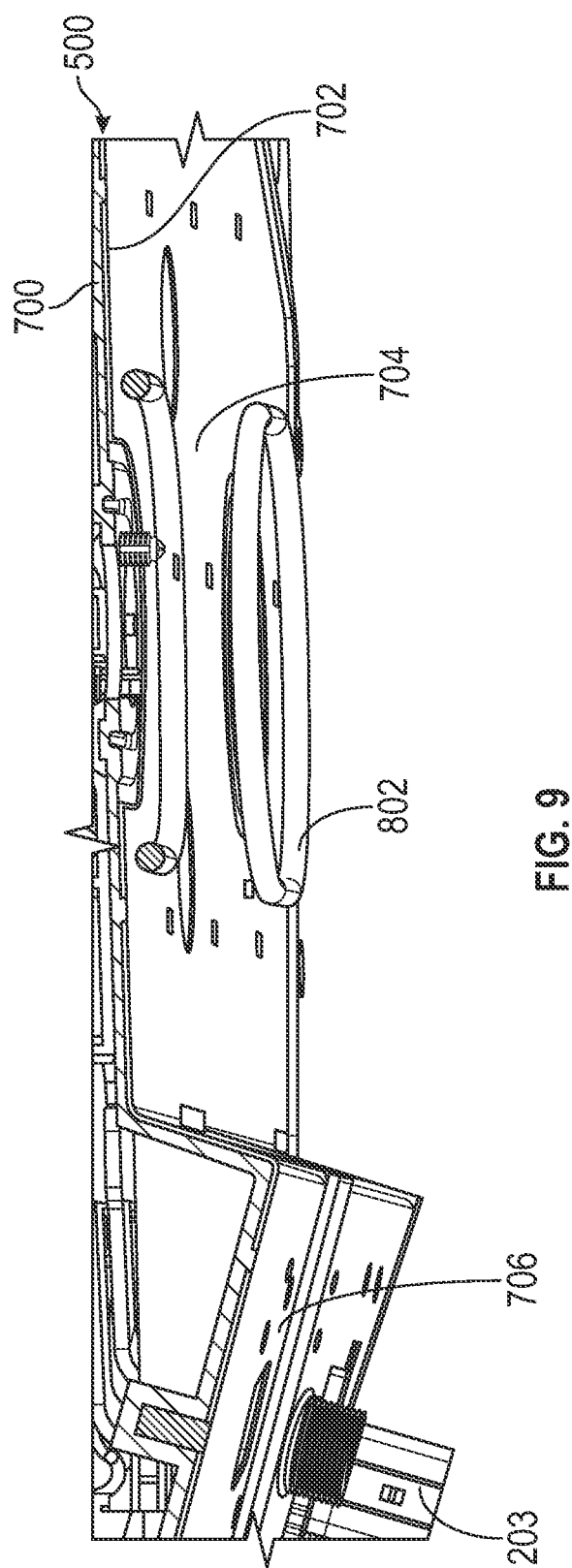
FIG. 9 illustrates a cross-sectional side view of a tray for a modular enclosure for one or more electrical components for a battery pack in accordance with one or more implementations.
Figure 10:
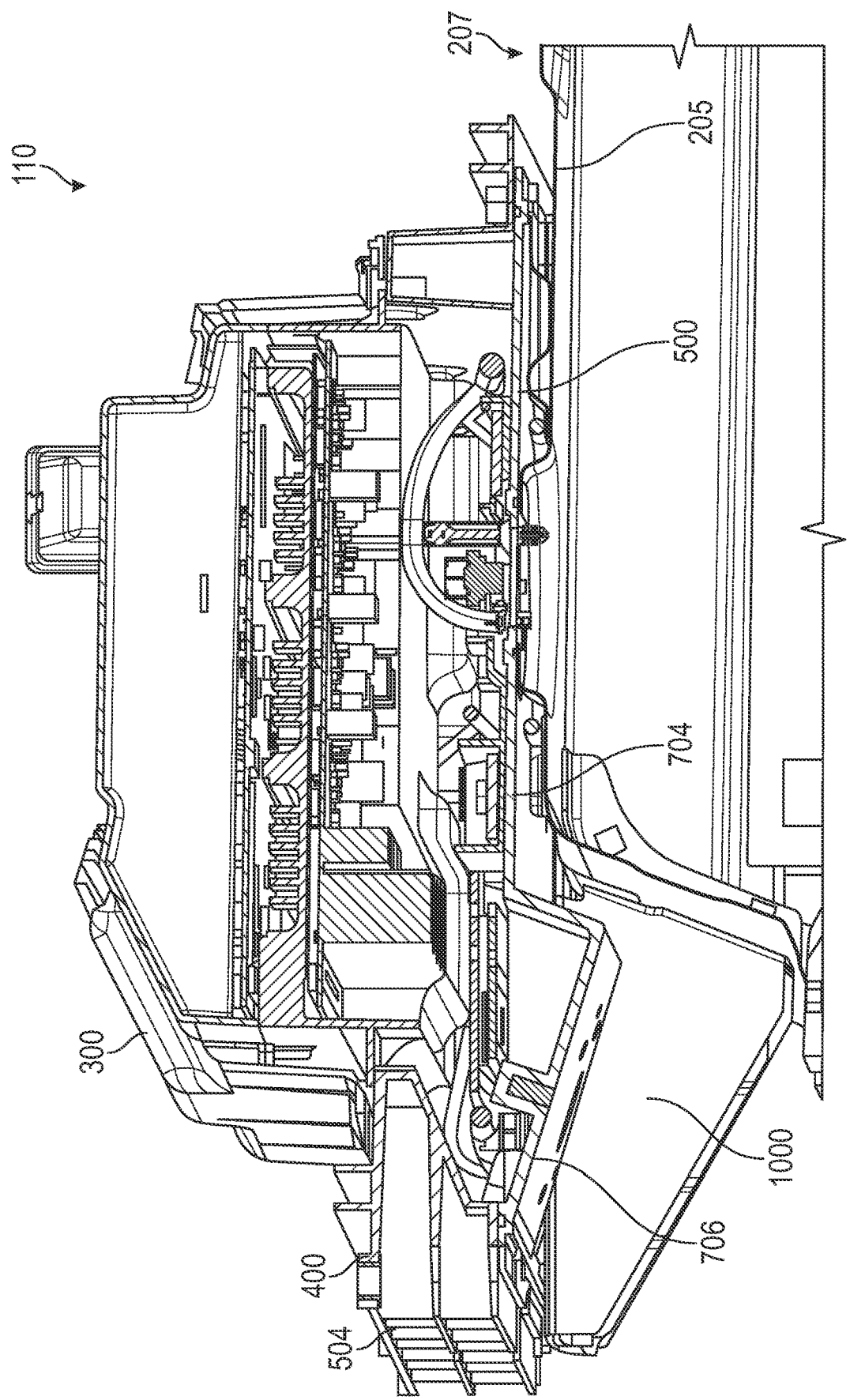
FIG. 10 illustrates a cross-sectional side perspective view of a portion of a battery pack having a modular enclosure for one or more electrical components for the battery pack in accordance with one or more implementations.

FIG. 9 illustrates a cross-sectional view of a portion of the tray 500. In the example of FIG. 9 it can be seen that the grounding structure 702 may be formed from a relatively thin layer of conductive material (e.g., metal) over which the solid insulating tray 700 can be overmolded. FIG. 10 illustrates a cross-sectional side perspective view of the battery pack 110 including the enclosure 290 of FIG. 8. In the example of FIG. 10, the enclosure 290 is attached to the pack frame 205 of the energy volume 207, and the access panel 300 installed. In this example, the ribbing 504 on the solid insulating tub 400 can be seen. In this example, the battery pack 110 also includes a support structure 1000. For example, the support structure 1000 may be configured to attach to the pack frame 205 of the battery pack 110 and to the second portion 706 of the tray that overhangs the end of the pack frame 205. For example, the support structure 1000 may help to provide additional structural impact resistance for the battery pack 110 and/or the vehicle 100.

Figure 11:
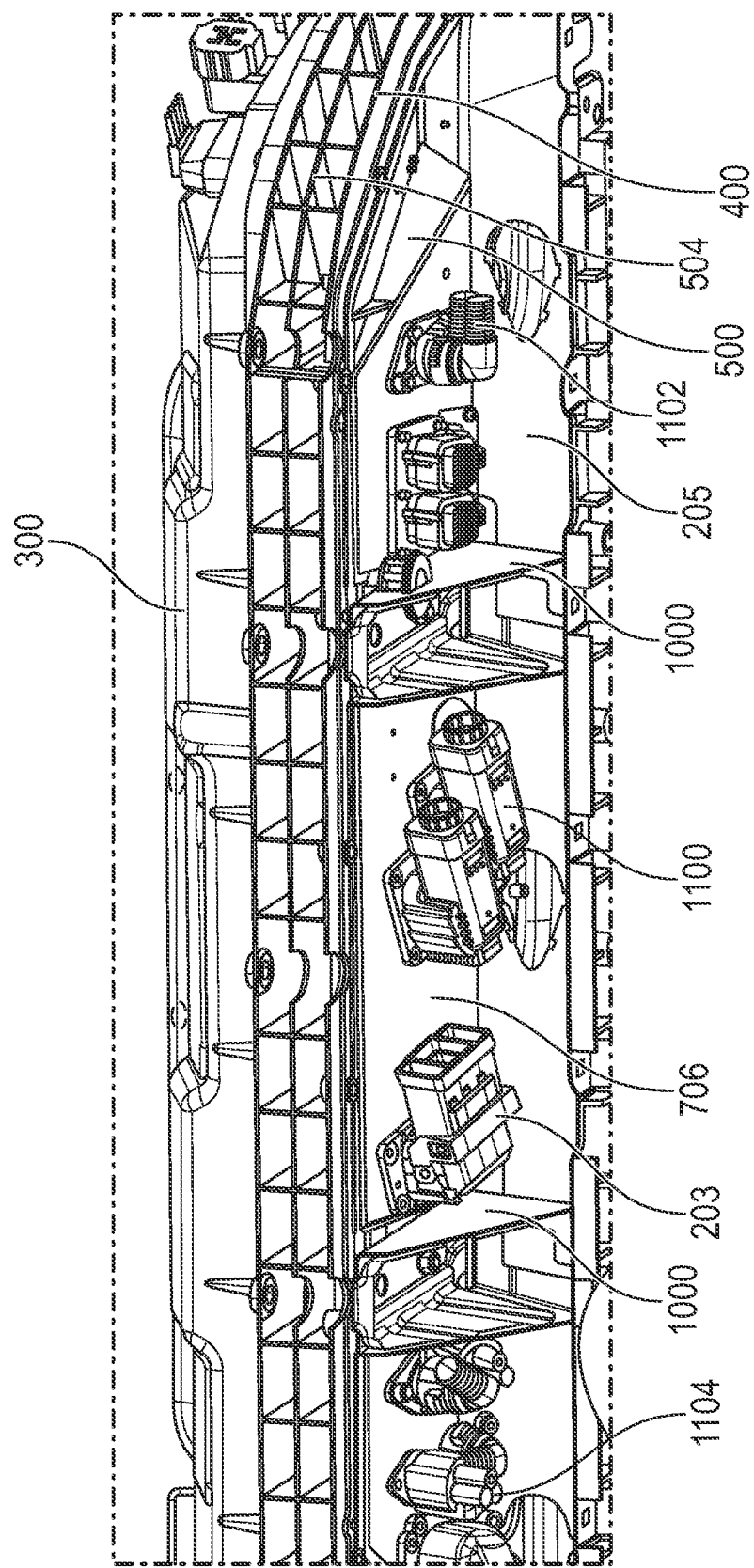
FIG. 11 illustrates a bottom perspective view of a portion of a battery pack having a modular enclosure for one or more electrical components for the battery pack in accordance with one or more implementations.

FIG. 11 illustrates a bottom perspective view of a portion of the battery pack 110 of FIG. 10, showing the second portion 706 of the tray 500 with various connectors attached thereto. For example, the electrical contact 203 and/or one or more other high-voltage connectors 1100 and/or low-voltage connectors 1104 that provide various voltages from the battery cells 120 within the energy volume 207 can be provided on the second portion 706 of the tray 500 that overhangs the edge of the pack frame 205. As shown, one or more fluid ports, such as a fluid port 1102 (e.g., a coolant port), may also be provided on the second portion 706 of the tray 500 that overhangs the edge of the pack frame 205. The fluid port 1102 and/or one or more other fluid ports on the portion 706 of the tray 500, may provide coolant inlet ports and/or coolant outlet ports for a cooling fluid to pass into and out of the enclosure 290 to cool one or more of the electrical components 304 disposed therein. FIG. 11 also shows how multiple support structures 1000 can be provided to support the overhanging portion of the enclosure 290 on the pack frame 205, and to strengthen the overall structure of the battery pack 110 and/or the vehicle 100.

In one or more implementations, the electrical contact(s) 203, the fluid port(s) 1102, the support structure(s) 1000, and the second portion 706 of the tray may be disposed in a "wet zone" of the vehicle 100. For example, the wet zone may be located outside of the seal 404 shown in FIG. 4.

As illustrated by FIGS. 3-11, the enclosure 290 may provide a modular, serviceable, grounded package that allows electrical component checks (e.g., checks and/or tests of electrical components 304, such as battery management system (BMS), contactors, the high voltage terminals 720 and 722, the low voltage connectors 732 and 736, the high-voltage connectors 1100, and/or the low-voltage connectors 1104) and/or thermal checks (e.g., by cycling coolant through the enclosure 290 via one or more fluid ports 1102) separately from the energy volume 207. For example, coolant cycling, testing that contactors open and close, testing that the BMS is functioning and/or software is updated can be performed on the enclosure 290 separately from the energy volume 207 (e.g., separate from tests and/or checks of the energy volume 207 and/or while the enclosure 290 is physically separated from the energy volume 207, such as prior to attachment of the enclosure 290 to the pack frame 110). As illustrated by FIGS. 3-11, the enclosure 290 may provide a modular, serviceable, grounded package that provides high-voltage, low-voltage, and thermal feedthroughs to external connectors/ports.

Figure 12:
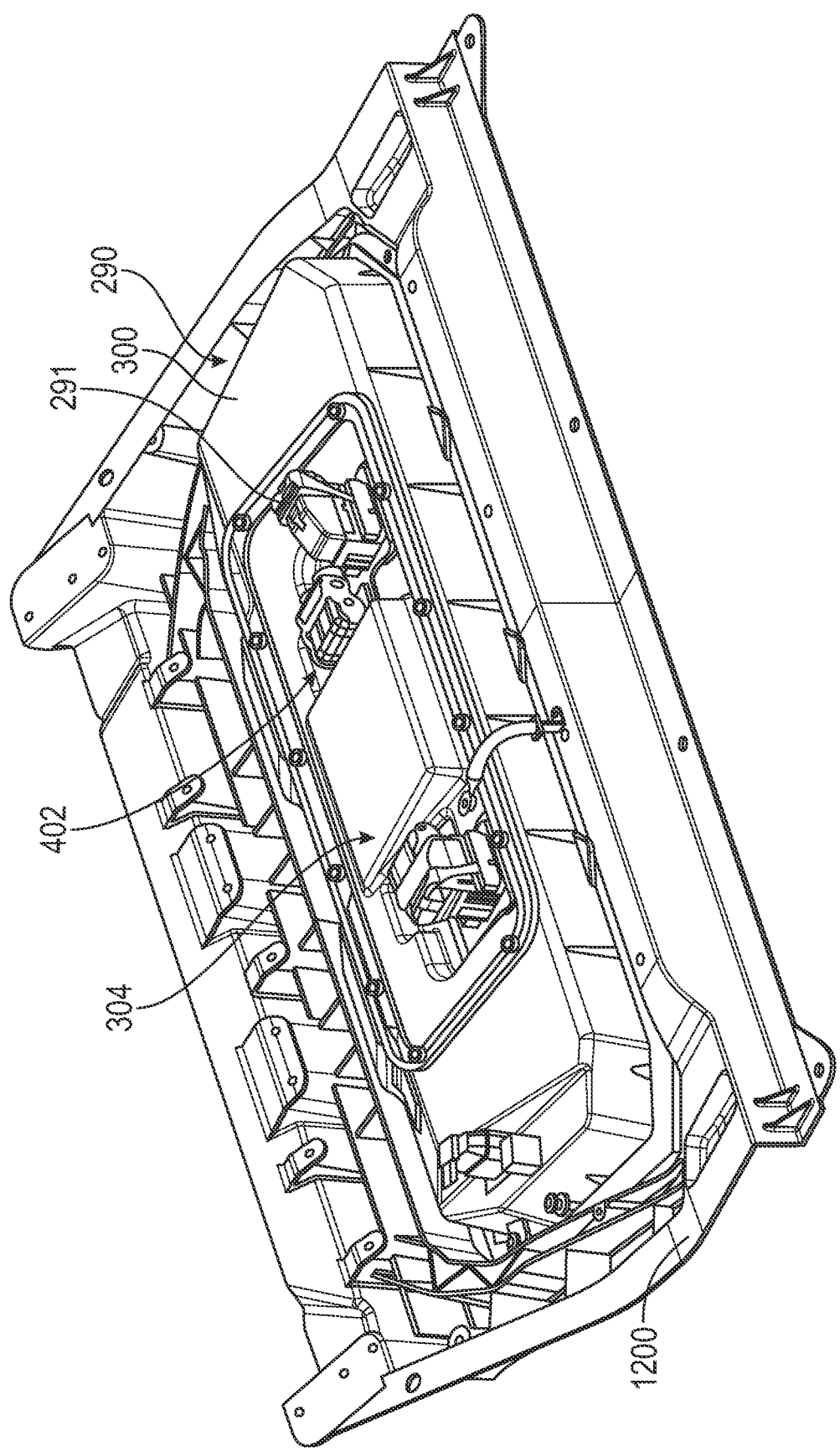
FIG. 12 illustrates a top perspective view of a modular enclosure coupled to a body structure of a vehicle in accordance with one or more implementations.'

In one or more implementations, assembling a vehicle including the battery pack 110 disclosed herein may include attaching the enclosure 290 to the pack frame 205 (e.g., and thus the energy volume 207), and then installing the battery pack 110 with the enclosure 290 attached thereto into the vehicle. For example, the enclosure 290 may be inserted into an opening in a body structure 1200 of the vehicle, as shown in FIG. 12. Inserting the enclosure 290 into the opening in the body structure 1200 may compress the seal 404 of FIG. 4 against an underside (not visible in FIG. 12) of the body structure 1200. For example, the body structure 1200 may be a body structure to which one or more seats (e.g., a rear seat) of the vehicle 100 may be mounted. As shown, a portion of the enclosure 290 that extends through the body structure 1200 may include the access panel 300, and the connector(s) 291 that are accessible through the openings 402 in the access panel 300. Due to the seal between the body structure 1200 and the seal 404 on the solid insulating body 400, the portion of the enclosure 290 that extends through the opening in the body structure 1200 may be in a "dry zone" of the vehicle 100.

In one or more implementations, a rear seat of the vehicle 100 may be mounted to the body structure 1200. The rear seat of the vehicle may include a removable cushion assembly that covers the access panel 300 and the connector 291 of the enclosure 290. The cushion assembly of the rear seat may be removed to provide access to the connector 291 and/or to the access panel 300 (e.g., which may also be removed for servicing of components within the enclosure 290).

Figure 13:
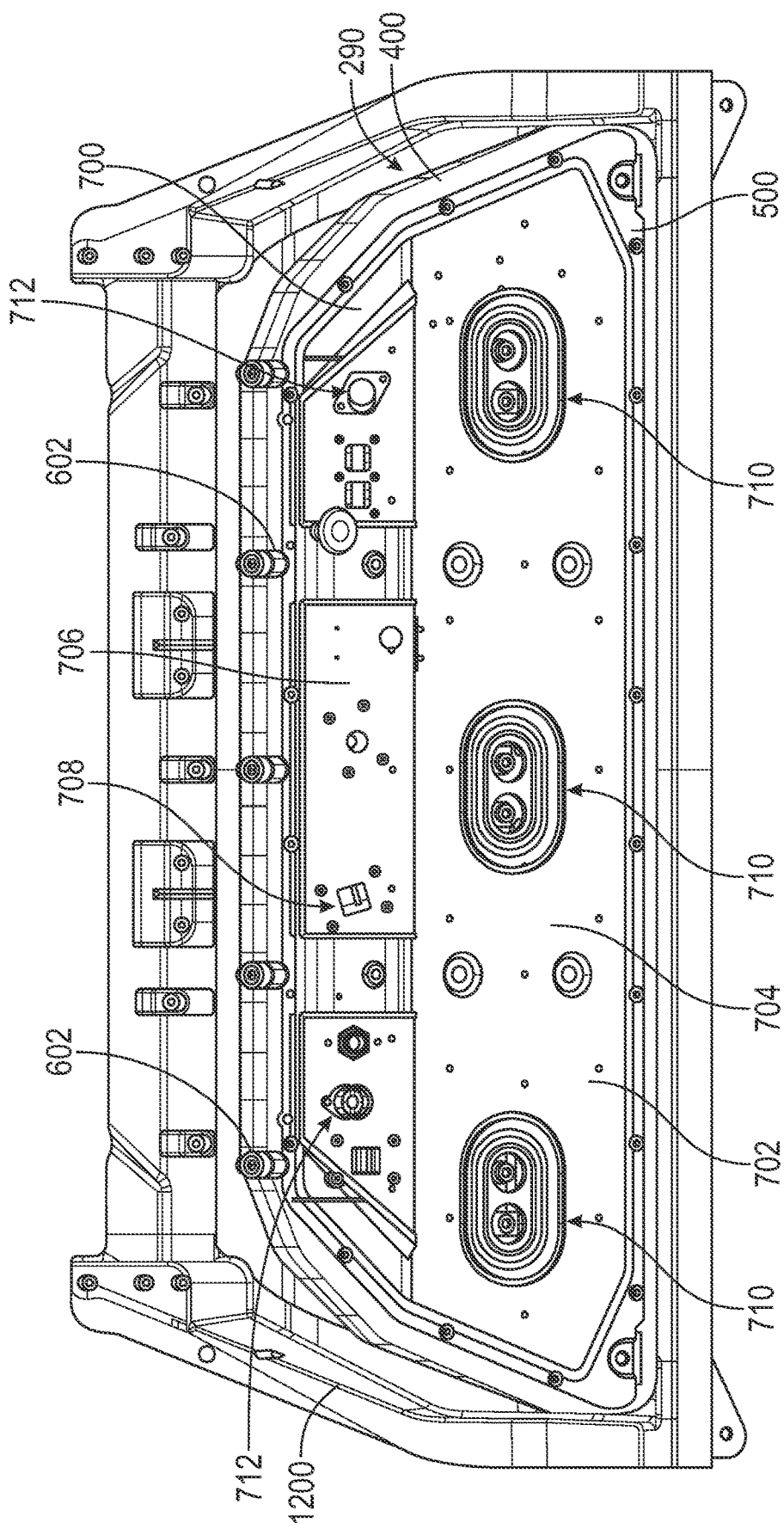
FIG. 13 illustrates a bottom view of a modular enclosure coupled to a body structure of a vehicle in accordance with one or more implementations.

FIG. 13 illustrates a bottom view of the enclosure 290 and body structure 1200 of FIG. 12. As illustrated in the bottom view of FIG. 13, the solid insulating tub 400 may abut the body structure 1200. In this arrangement, the bottom surface of the tray 500, which may include the openings 710, 708, and 712 may be formed in a "wet zone" of the vehicle, outside of the seal 404 on the solid insulating tub 400. For example, bolts through the features 602 on the solid insulating tub 400 may be used to attach the solid insulating tub, and thereby the enclosure 290, to the body structure 1200.

Example implementations of a modular enclosure 290 for a battery pack 110 have been described herein in connection with, for example, FIGS. 2A and 3-12. However, these implementations of the enclosure 290 are merely illustrative, and other implementations of the enclosure are contemplated herein.

Figure 14:
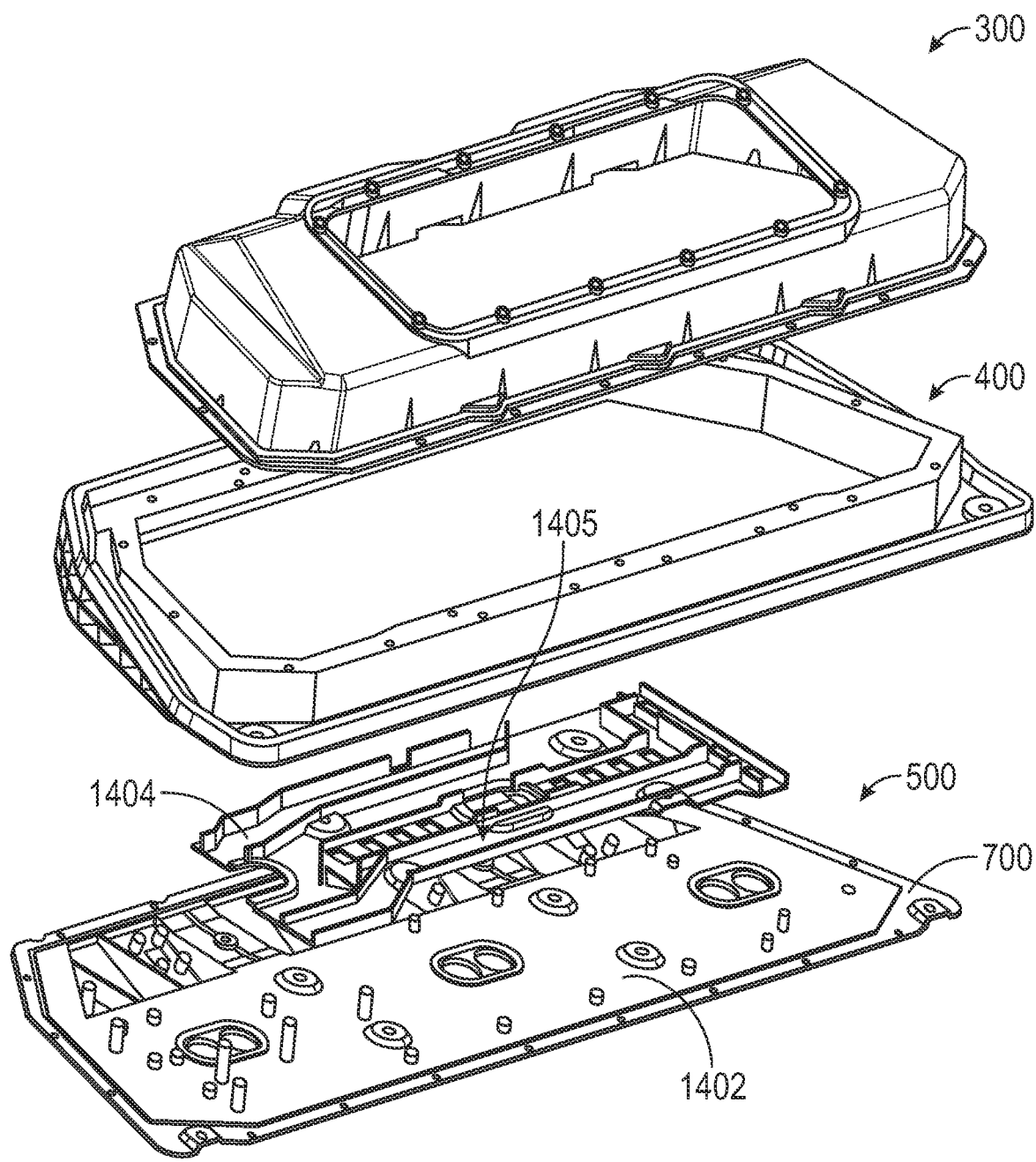
FIG. 14 illustrates an exploded perspective view of another example modular enclosure for one or more electrical components for a battery pack in accordance with one or more implementations.

For example, FIG. 14 illustrates another implementation of the enclosure 290, in which the tray 500 includes the solid insulating tray 700 and a conductive layer 1402 (e.g., a conductive foil, a molded metal structure, a conductive plate, a conductive resin, or a conductive coating) on an interior surface of the solid insulating tray 700. In this implementation, the tray 500 may also include the grounding structure 702 (e.g., a molded metal) on an exterior surface of the tray (e.g., as in the examples of FIGS. 7. 9, and 13). In this example, the enclosure 290 may also include a retention structure 1404. For example, the retention structure 1404 may include one or more molded features 1405 (e.g., similar to the molded features 506 of FIG. 5, but formed on a separate retention structure from the tray 500) configured for retaining, supporting, securing, or otherwise holding or guiding one or more of the electrical components 304 (e.g., electrical components 304 disposed in the gap 807 of FIG. 8). The implementation of FIG. 14 may provide additional grounding for the enclosure 290, but may prevent the molded features 506 from being formed on the tray 500 itself. The molded features 1405 on the retention structure 1404 may replace the molded features 506.

Figure 15:
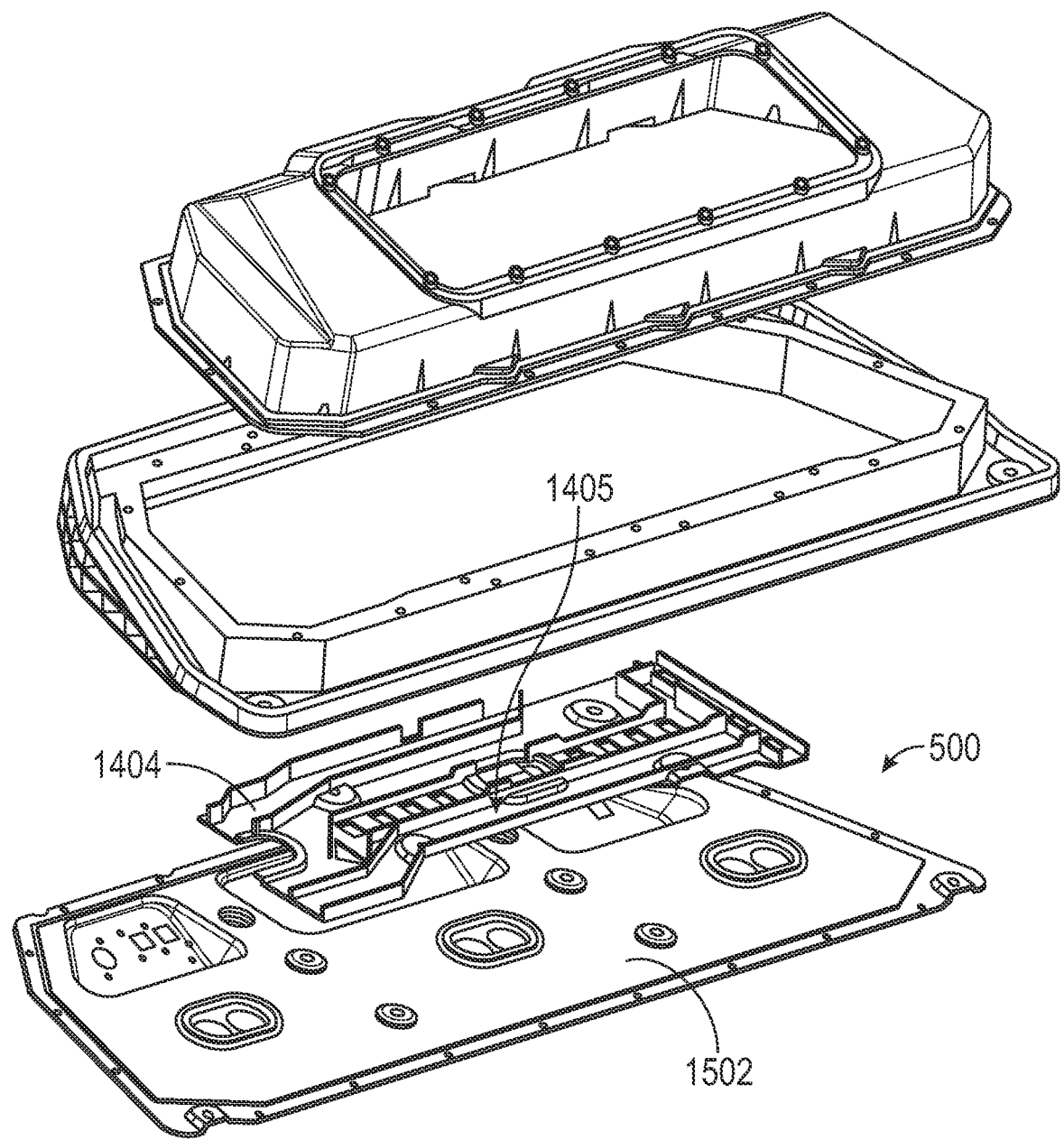
FIG. 15 illustrates an exploded perspective view yet another example modular enclosure for one or more electrical components for a battery pack in accordance with one or more implementations.
Figure 16:
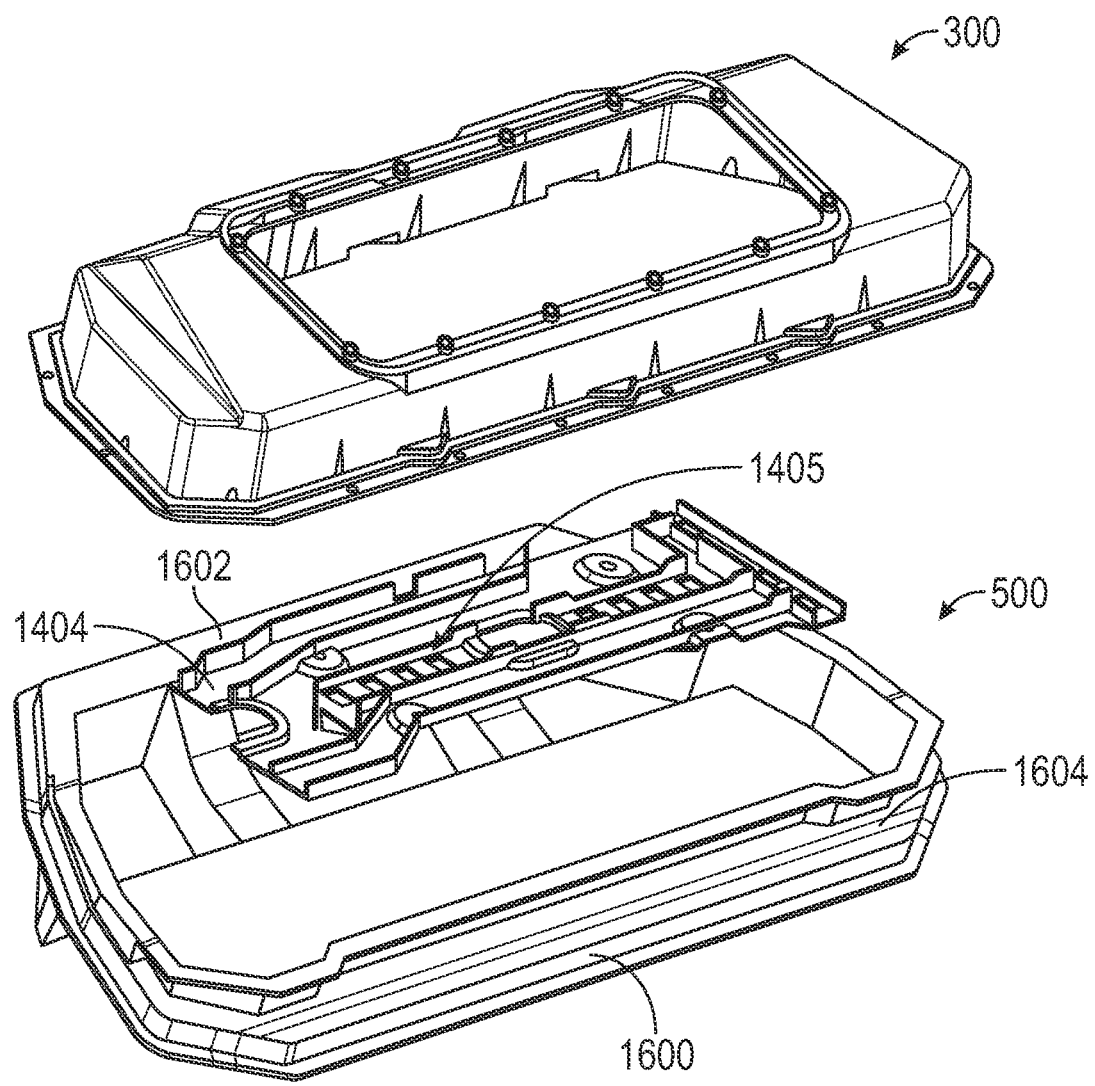
FIG. 16 illustrates an exploded perspective view still another example modular enclosure for one or more electrical components for a battery pack in accordance with one or more implementations.

As another example, FIG. 15 illustrates another implementation of the enclosure 290, in which the tray 500 is formed from a metal tray 1502. In this example, the enclosure 290 may also include the retention structure 1404 including the molded features 1405 (e.g., configured for retaining one or more of the electrical components 304). For example, the retention structure 1404 may be attached to the metal tray 1502. As another example, FIG. 16 illustrates another implementation of the enclosure 290, in which one or more features of the solid insulating tub 400 are integrated into the tray 500 (e.g., in a deep tray implementation of the tray 500). For example, as shown in FIG. 16, in one or more implementations, the tray 500 may include a solid insulating structure 1600 that is configured for mounting the one or more electrical components thereto, and the access panel 300 may be configured to attach directly to the tray 500 (e.g., to the solid insulating structure 1600) to at least partially enclose the electrical components 304.

For example, the solid insulating structure 1600 may be overmolded on a grounding structure 702 (e.g., as in the examples of FIGS. 7, 9, and 13) and may include a ledge 1602 for mounting one or more of the electronic components 304. For example, the ledge 1602 may be configured to support the flange 806 shown in FIG. 8, such that a gap similar to the gap 807 is formed between the electrical component 304 having the flange 806 and a floor of the solid insulating tray 1600. In the example of FIG. 16, the enclosure 290 also includes the retention structure 1404 having the molded features 1405 (e.g., configured for retaining one or more electrical components 304 within the enclosure formed by the solid insulating structure 1600 and the access panel 300). In the example of FIG. 16, the solid insulating tray 1600 may include a surface, such as surface 1604, that is configured to sealingly abut a vehicle structure, such as the body structure 1200 of FIGS. 12 and 13. When servicing of one or more electrical components 304 within the enclosure 290 is desired, the access panel 300 may be detached from the solid insulating tray 1600 to provide access to the electrical components 304 mounted on the solid insulating tray 1600.

As illustrated by FIGS. 1A-16, in one or more implementations, a vehicle 100 may be provided with a battery pack 110 that includes an enclosure 290 for one or more electrical components 304 for the battery pack 110, in which the enclosure is configured to mechanically and electrically couple to an energy volume 207 of the battery pack 110. The enclosure 290 may include an access panel 300 formed from a solid insulating structure 301 configured to at least partially cover the one or more electrical components, and a conductive layer 302 on a surface of the solid insulating structure. The enclosure may also include a mid-structure (e.g., solid insulating tub 400) that includes a solid insulating structure 507, a conductive layer 508 on an interior surface of the solid insulating structure 507, and ribbing 504 configured to provide structural impact resistance for the enclosure. The enclosure 290 may also include a bottom panel (e.g., tray 500). The bottom panel and the access panel may be configured to attach to the mid-structure to form the enclosure 290. The battery pack 110 and/or the enclosure 290 may also include one or more support structures 1000 that are configured to attach to a frame (e.g., pack frame 205) of the battery pack 110 and to an overhang (e.g., second portion 706) on the bottom panel to provide structural impact resistance for the vehicle. In one or more implementations, the mid-structure (e.g., solid insulating tub 400) may also include a sealing feature (e.g., a groove 511 and/or a seal 404) for sealingly attaching the enclosure 290 to a body structure 1200 of the vehicle 100. The bottom panel (e.g., tray 500) may also include a plurality of seals 802 for sealingly protecting a plurality of high voltage ports between the enclosure 290 and the battery pack 110 (e.g., the energy volume of the battery pack 110).

Figure 17:
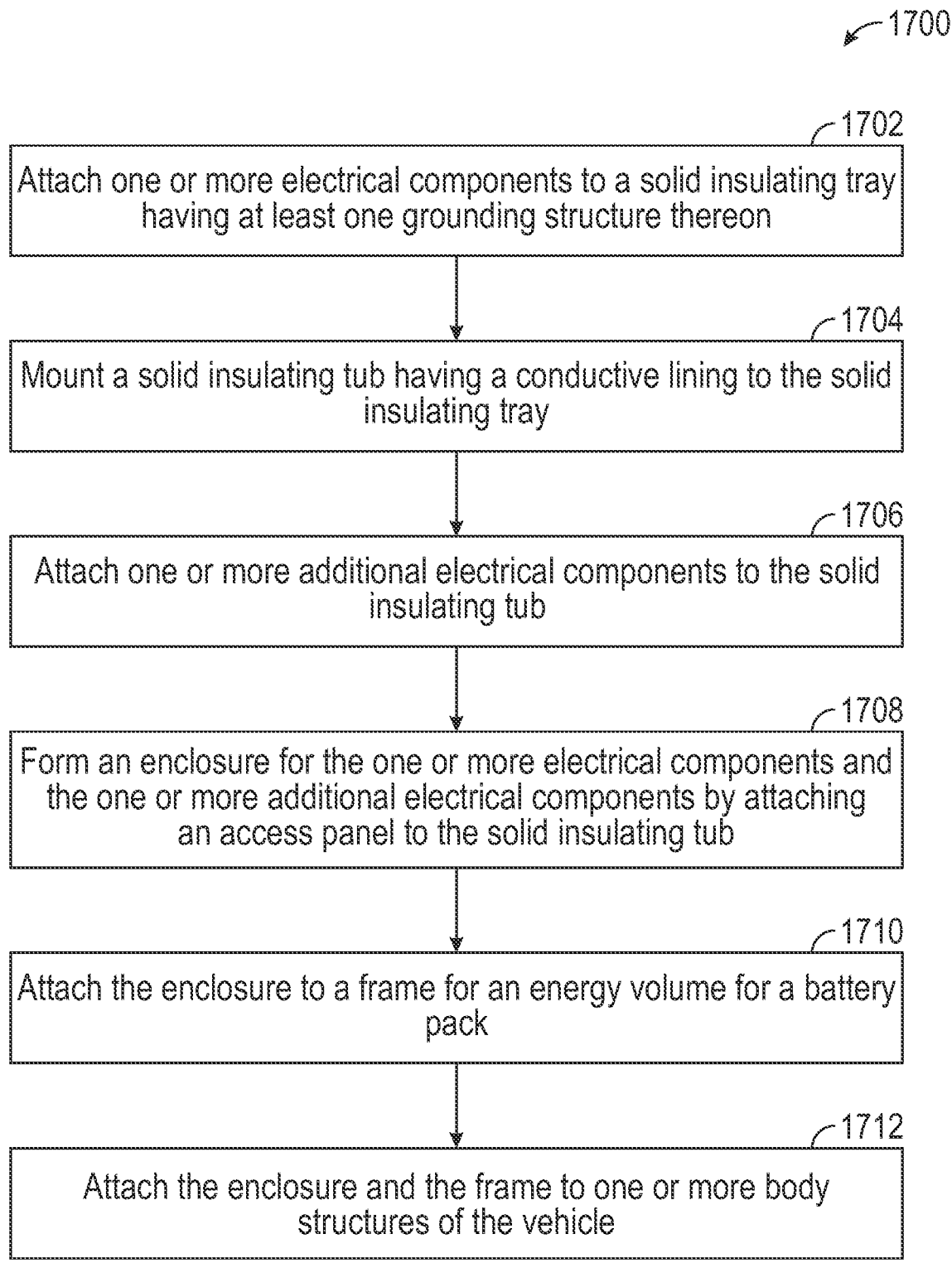
FIG. 17 illustrates a flow chart of illustrative operations that may be performed for assembling a vehicle in accordance with one or more implementations.

FIG. 17 illustrates a flow diagram of an example process 1700 that may be performed for assembling a vehicle, in accordance with implementations of the subject technology. For explanatory purposes, the process 1700 is primarily described herein with reference to the vehicle 100 and enclosure 290 of FIGS. 1A-16. However, the process 1700 is not limited to the vehicle 100 and enclosure 290, and one or more blocks (or operations) of the process 1700 may be performed by or with one or more other structural components of other devices, systems, or moveable apparatuses. Further for explanatory purposes, some of the blocks of the process 1700 are described herein as occurring in serial, or linearly. However, multiple blocks of the process 1700 may occur in parallel. In addition, the blocks of the process 1700 need not be performed in the order shown and/or one or more blocks of the process 1700 need not be performed and/or can be replaced by other operations.

As illustrated in FIG. 17, at block 1702, one or more electrical components (e.g., electrical components 304, such as a high voltage distribution box, cables, busbars, etc.) may be attached to a solid insulating tray (e.g., tray 500, solid insulating tray 700, and/or solid insulating tray 1600) having at least one grounding structure (e.g., grounding structure 702) thereon.

At block 1704, a solid insulating tub (e.g., solid insulating tub 400) having a conductive layer (e.g., conductive layer 508) may be mounted to the solid insulating tray (e.g., using fasteners 502 or other fasteners).

At block 1706, one or more additional electrical components (e.g., an electrical component 304 having a flange 806) may be mounted to the solid insulating tub.

At block 1708, an enclosure 290 for the one or more electrical components and the one or more additional electrical components may be formed by attaching an access panel (e.g., access panel 300) to the solid insulating tub (e.g., using fasteners 505). The access panel may include one or more openings (e.g., openings 402) for accessing one or more ports (e.g., connectors 291) while the access panel is attached to the solid insulating tub.

At block 1710, the enclosure may be attached to a frame (e.g., pack frame 205) for an energy volume (e.g., energy volume 207) for a battery pack (e.g., battery pack 110). Attaching the enclosure to the frame of the energy volume may include mechanically and electrically coupling the enclosure to the frame of the energy volume. For example, mechanically coupling the enclosure to the frame of the energy volume may include bolting the enclosure to the frame (e.g., using bolts that pass through the solid insulating tub and/or the tray) and/or forming one or more seals (e.g., seals 802) between the enclosure and the frame. For example, electrically coupling the enclosure to the frame of the energy volume may include electrically coupling the electrical components within the enclosure to one or more high-voltage contacts on the frame that are electrically coupled to one or more battery cells and/or battery modules within the frame.

At block 1712, the enclosure and the frame may be attached to one or more body structures (e.g., body structure 1200) of the vehicle. Attaching the enclosure and the frame to the body structure may include bolting the enclosure to the body structure via the solid insulating tub. Attaching the enclosure and the frame to the body structure may include compressing a seal (e.g., seal 404) on the solid insulating tub against the body structure. Attaching the enclosure and the frame to the body structure may include attaching (e.g., bolting) the frame to the body structure and/or another body structure at one or more locations separate from the enclosure.

In one or more implementations, a method of servicing a vehicle may also be provided. The method of servicing the vehicle may include removing an access panel (e.g., access panel 300) of an enclosure (e.g., enclosure 290) of a battery pack (e.g., battery pack 110) while the battery pack is installed in the vehicle; and servicing (e.g., removing, replacing, and/or repairing) one or more electrical components (e.g., electrical components 304) within the enclosure via an opening formed by removing the access panel, while the battery pack is installed in the vehicle. In one or more implementations, a portion (e.g., a cushion or cushion assembly) of a seat (e.g., a rear seat) of the vehicle may be removed to provide access to the access panel, for removing the access panel.

Aspects of the subject technology can help improve the reliability and/or range of electric vehicles. This can help facilitate the functioning of and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
   an enclosure for one or more electrical components for a battery pack, wherein the enclosure is configured to mechanically and electrically couple to an energy volume of the battery pack, and wherein the enclosure comprises:
   an access panel comprising:
      an insulating structure configured to at least partially cover the one or more electrical components; and
      a conductive layer on a surface of the insulating structure;
   a tray configured for mounting the one or more electrical components thereto, wherein the tray and the access panel are configured to at least partially enclose the one or more electrical components, and wherein the tray comprises a solid insulating tray; and
   at least one grounding structure coupled to the solid insulating tray.

2. The apparatus of claim 1, wherein the insulating structure comprises a solid insulating structure, and wherein the surface of the solid insulating structure having the conductive layer comprises an interior surface of the solid insulating structure, and wherein the conductive layer is configured, at least in part, to mitigate electromagnetic interference (EMI), by the one or more electrical components, with one or more electronic components external to the enclosure.

3. The apparatus of claim 2, wherein the conductive layer comprises at least one of: a foil, a coating or a resin.

4. The apparatus of claim 1, wherein the at least one grounding structure comprises a metal, and wherein the solid insulating tray is overmolded on the metal.

5. The apparatus of claim 4, wherein the solid insulating tray comprises a plurality of molded features configured for retaining the one or more electrical components.

6. An apparatus, comprising:
an enclosure for one or more electrical components for a battery pack, wherein the enclosure is configured to mechanically and electrically couple to an energy volume of the battery pack, and wherein the enclosure comprises:
an access panel comprising:
an insulating structure configured to at least partially cover the one or more electrical components;
a conductive layer on a surface of the insulating structure;
a tray configured for mounting the one or more electrical components thereto, wherein the tray and the access panel are configured to at least partially enclose the one or more electrical components; and
a solid insulating tub disposed between the tray and the access panel, wherein the access panel and the tray are configured to be attached to the solid insulating tub, and wherein the solid insulating tub comprises an additional conductive layer on a surface of the solid insulating tub.

7. The apparatus of claim 6, wherein the solid insulating tub comprises a plurality of ribs configured to provide structural rigidity to the solid insulating tub.

8. The apparatus of claim 6, wherein the tray comprises an outer surface having a first portion configured to interface with a frame of the energy volume of the battery pack, and a second portion configured to overhang the frame of the energy volume of the battery pack.

9. The apparatus of claim 8, wherein the tray comprises:
one or more first openings in the first portion of the outer surface for accommodating one or more high voltage feedthroughs and one or more low voltage feedthroughs to the energy volume; and
one or more second openings in the second portion of the outer surface for accommodating one or more high voltage output connectors coupled to the one or more electrical components.

10. The apparatus of claim 9, wherein:
the tray further comprises one or more third openings in the second portion, the one or more third openings configured to accommodate one or more coolant ports for the enclosure;
the one or more electrical components comprise an assembly having first and second high voltage terminals and at least one low voltage connector; and
the assembly is configured to position the first and second high voltage terminals as the one or more high voltage feedthroughs, and the at least one low voltage connector as the one or more low voltage feedthroughs, within one of the one or more first openings.

11. The apparatus of claim 6, wherein the solid insulating tub comprises a ledge for mounting a flange of one of the one or more electrical components.

12. An apparatus, comprising:
an enclosure for one or more electrical components for a battery pack, wherein the enclosure is configured to mechanically and electrically couple to an energy volume of the battery pack, and wherein the enclosure comprises:
an access panel comprising:
an insulating structure configured to at least partially cover the one or more electrical components;
a conductive layer on a surface of the insulating structure;
a tray configured for mounting the one or more electrical components thereto, wherein the tray and the access panel are configured to at least partially enclose the one or more electrical components, wherein the tray comprises a solid insulting tray, a conductive layer on an interior surface of the tray, and a molded metal on an exterior surface of the tray; and
a retention structure comprising a plurality of molded features configured for retaining the one or more electrical components.

13. An apparatus, comprising:
an enclosure for one or more electrical components for a battery pack, wherein the enclosure is configured to mechanically and electrically couple to an energy volume of the battery pack, and wherein the enclosure comprises:
an access panel comprising:
an insulating structure configured to at least partially cover the one or more electrical components;
a conductive layer on a surface of the insulating structure,
a tray configured for mounting the one or more electrical components thereto, wherein the tray and the access panel are configured to at least partially enclose the one or more electrical components, wherein the tray comprises a metal tray; and
a retention structure comprising a plurality of molded features configured for retaining the one or more electrical components.

14. An apparatus, comprising:
an enclosure for one or more electrical components for a battery pack, wherein the enclosure is configured to mechanically and electrically couple to an energy volume of the battery pack, and wherein the enclosure comprises:
an access panel comprising:
an insulating structure configured to at least partially cover the one or more electrical components;
a conductive layer on a surface of the insulating structure;
a tray comprising a solid insulating structure configured for mounting the one or more electrical components thereto, wherein the access panel is configured to attach directly to the tray to at least partially enclose the one or more electrical components; and
a retention structure comprising a plurality of molded features configured for retaining the one or more electrical components within the enclosure formed by the solid insulating structure and the access panel.

15. A vehicle, comprising:
a battery pack, comprising:
an enclosure for one or more electrical components for the battery pack, wherein the enclosure is configured to mechanically and electrically couple to an energy volume of the battery pack, and wherein the enclosure comprises:

an access panel comprising:
  an insulating structure configured to at least partially cover the one or more electrical components;
  a conductive layer on a surface of the insulating structure;
a tray configured for mounting the one or more electrical components thereto, wherein the tray and the access panel are configured to at least partially enclose the one or more electrical components, and wherein the tray comprises a solid insulating tray; and
at least one grounding structure coupled to the solid insulating tray.

16. The vehicle of claim 15, wherein the enclosure further comprises:
  a mid-structure comprising: a solid insulating structure, a conductive layer on an interior surface of the solid insulating structure, and ribbing configured to provide structural impact resistance for the enclosure;
  wherein the solid insulating tray comprises a bottom panel, wherein the bottom panel and the access panel are configured to attach to the mid-structure to form the enclosure; and
  a support structure configured to attach to a frame of the battery pack and to an overhang on the bottom panel to provide structural impact resistance for the vehicle.

17. The vehicle of claim 16, wherein the mid-structure further comprises a sealing feature for sealingly attaching the enclosure to a body structure of the vehicle, and wherein the bottom panel further comprises a plurality of seals for sealing a plurality of high voltage ports between the enclosure and the battery pack.

* * * * *